United States Patent
Kim et al.

(10) Patent No.: US 9,851,890 B2
(45) Date of Patent: Dec. 26, 2017

(54) TOUCHSCREEN KEYBOARD CONFIGURATION METHOD, APPARATUS, AND COMPUTER-READABLE MEDIUM STORING PROGRAM

(71) Applicant: Samsung Electronics Co., Ltd., Gyeonggi-do (KR)

(72) Inventors: Yu-Na Kim, Gyeonggi-do (KR); Sang-Hyup Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 166 days.

(21) Appl. No.: 14/107,317

(22) Filed: Dec. 16, 2013

(65) Prior Publication Data

US 2014/0181722 A1 Jun. 26, 2014

(30) Foreign Application Priority Data

Dec. 21, 2012 (KR) .................. 10-2012-0151153

(51) Int. Cl.
*G06F 3/0489* (2013.01)
*G06F 3/0488* (2013.01)
(Continued)

(52) U.S. Cl.
CPC .......... *G06F 3/0488* (2013.01); *G06F 1/1694* (2013.01); *G06F 3/017* (2013.01);
(Continued)

(58) Field of Classification Search
CPC ...... G06F 3/017; G06F 3/0233; G06F 1/1694; G06F 3/0488; G06F 3/04886;
(Continued)

(56) References Cited

U.S. PATENT DOCUMENTS 5,993,089 A * 11/1999 Burrell, IV ............... B41J 5/06
341/22
7,190,351 B1 * 3/2007 Goren .................. G06F 1/1626
345/156
(Continued)

FOREIGN PATENT DOCUMENTS

CN 101135940 A 3/2008
CN 101325768 A 12/2008
(Continued)

OTHER PUBLICATIONS

Braille Dynamic Virtual Keyboard for iPhone, iPod Touch, iPad, Mar. 5, 2011, XP054975815 https://www.youtube.com/watch?v=k5snVu5q2b8.
(Continued)

*Primary Examiner* — Nicholas Klicos
(74) *Attorney, Agent, or Firm* — Cha & Reiter LLC.

(57) ABSTRACT

An input method usable by a terminal including a touch screen display, identifies first touch input locations on a touch screen. The first touch input locations comprise a predetermined number of concurrent multiple touches. A predetermined number of input buttons comprising a predetermined number of areas on the touch screen are associated with corresponding identified first touch input locations. A touch pattern is detected comprising a second touch input of one or more of the predetermined number of input buttons and an alphanumeric input corresponding to the detected touch pattern is processed.

22 Claims, 20 Drawing Sheets

(51) Int. Cl.
| | |
|---|---|
| *G06F 3/023* | (2006.01) |
| *G06F 3/0481* | (2013.01) |
| *G06F 1/16* | (2006.01) |
| *G06F 3/01* | (2006.01) |
| *G09B 21/00* | (2006.01) |
| *G09B 21/02* | (2006.01) |

(52) U.S. Cl.
CPC .......... *G06F 3/0233* (2013.01); *G06F 3/0235* (2013.01); *G06F 3/04817* (2013.01); *G06F 3/04883* (2013.01); *G06F 3/04886* (2013.01); *G09B 21/003* (2013.01); *G06F 2200/1637* (2013.01); *G06F 2203/04808* (2013.01); *G09B 21/00* (2013.01); *G09B 21/006* (2013.01); *G09B 21/02* (2013.01); *G09B 21/025* (2013.01)

(58) Field of Classification Search
CPC ............... G06F 3/04817; G06F 3/0235; G06F 3/04883; G06F 2203/04808; G06F 2200/1637; G09B 21/003; G09B 21/007; G09B 21/00; G09B 21/02; G09B 21/025; G09B 21/006
See application file for complete search history.

(56) References Cited

U.S. PATENT DOCUMENTS

| | | | |
|---|---|---|---|
| 2003/0098803 A1 | 5/2003 | Gourgey et al. | |
| 2004/0021704 A1 | 2/2004 | Mitsutake | |
| 2004/0054540 A1* | 3/2004 | Kouzu | G09B 21/006 704/275 |
| 2004/0218451 A1* | 11/2004 | Said | G06F 3/0481 365/222 |
| 2005/0079472 A1* | 4/2005 | Shimamura | G09B 21/025 434/114 |
| 2005/0179565 A1* | 8/2005 | Mase | G06F 3/016 341/21 |
| 2006/0001913 A1* | 1/2006 | Akaiwa | B41J 3/32 358/3.29 |
| 2007/0070051 A1* | 3/2007 | Westerman | G06F 3/0235 345/173 |
| 2007/0247441 A1 | 10/2007 | Kim et al. | |
| 2008/0309521 A1 | 12/2008 | Zhang et al. | |
| 2009/0182901 A1* | 7/2009 | Callaghan | G06F 9/44505 710/8 |
| 2009/0237361 A1* | 9/2009 | Mosby | G06F 3/04883 345/173 |
| 2009/0322673 A1* | 12/2009 | Cherradi El Fadili | G06F 3/017 345/157 |
| 2010/0055651 A1* | 3/2010 | Rantala | G09B 21/003 434/114 |
| 2010/0177035 A1* | 7/2010 | Schowengerdt | G06F 1/163 345/156 |
| 2010/0182242 A1* | 7/2010 | Fields | G06F 3/016 345/169 |
| 2010/0238114 A1* | 9/2010 | Vartanian | G06F 3/0416 345/168 |
| 2011/0012716 A1* | 1/2011 | Miller, IV | G06F 3/0235 340/407.2 |
| 2011/0020771 A1* | 1/2011 | Rea | G09B 21/02 434/114 |
| 2011/0032202 A1* | 2/2011 | Aoyagi | G06F 1/1626 345/173 |
| 2011/0074692 A1* | 3/2011 | Causey | G06F 3/0216 345/169 |
| 2011/0074714 A1 | 3/2011 | Ogawa et al. | |
| 2011/0111376 A1* | 5/2011 | Schramm | G09B 5/08 434/114 |
| 2011/0143321 A1* | 6/2011 | Tran | G09B 21/007 434/114 |
| 2011/0304546 A1 | 12/2011 | Rea | |
| 2011/0304558 A1* | 12/2011 | Pasquero | G06F 3/0488 345/173 |
| 2012/0044174 A1 | 2/2012 | Kim | |
| 2012/0096393 A1 | 4/2012 | Shim et al. | |
| 2012/0113007 A1* | 5/2012 | Koch | G06F 3/0488 345/168 |
| 2012/0123781 A1 | 5/2012 | Park et al. | |
| 2012/0129568 A1* | 5/2012 | Mahalingam | G06F 3/0233 455/550.1 |
| 2012/0133589 A1* | 5/2012 | Marsden | G06F 3/04886 345/168 |
| 2012/0176320 A1* | 7/2012 | Burrell, IV | G06F 1/1626 345/168 |
| 2012/0260207 A1* | 10/2012 | Treskunov | G06F 3/04886 715/773 |
| 2012/0268296 A1* | 10/2012 | Morikawa | H03M 11/08 341/22 |
| 2012/0327013 A1* | 12/2012 | Lee | G06F 1/1626 345/174 |
| 2013/0016042 A1* | 1/2013 | Makinen | G06F 3/016 345/168 |
| 2013/0019191 A1* | 1/2013 | Arnold | G06F 3/04886 715/765 |
| 2013/0088437 A1* | 4/2013 | Nishidate | A63F 13/06 345/173 |
| 2013/0222247 A1* | 8/2013 | Liu | G06F 3/04886 345/168 |
| 2013/0249821 A1* | 9/2013 | Dharmaraja | G06F 3/0219 345/173 |

FOREIGN PATENT DOCUMENTS

| | | |
|---|---|---|
| CN | 101339467 A | 1/2009 |
| EP | 2 450 783 A1 | 5/2012 |
| JP | 2002-341991 A | 11/2002 |
| JP | 2004-62867 A | 2/2004 |
| JP | 2006-128788 A | 5/2006 |
| JP | 2007-293820 A | 11/2007 |
| JP | 2011-227854 A | 11/2011 |
| JP | 2012-64066 A | 3/2012 |
| JP | 2012-104092 A | 5/2012 |
| JP | 2013-541776 A | 11/2013 |
| JP | 2014-13518 A | 1/2014 |
| KR | 10-1123212 B1 | 3/2012 |
| WO | 2012/048380 A1 | 4/2012 |

OTHER PUBLICATIONS

Mario Romero et al., BrailleTouch: Designing a Mobile Eyes-Free Soft Keyboard, MobileHCI 2011, Aug. 30,-Sep. 2, 2011, Stockholm, Sweden, pp. 707-709, XP055010547.
Shiri Azenkot et al., Input Finger Detection for Nonvisual Touch Screen Text Entry in Perkinput, Graphics Interface 2012, May 28, 2012, Toronto, Canada, pp. 121-129, XP058009882.
European Search Report, dated Apr. 14, 2016.
European Search Report, dated Nov. 28, 2016.
Fard, et al.; "Braille-based text Input for Multi-touch Screen Mobile Phones"; Master's Thesis; Mar. 2011; School of Computing Blekinge Institute of Technology; Sweden.
Ruiz, et al.; "User-Defined Motion Gestures for Mobile Interaction"; CHI 2011 Session: Mid-air Pointing and Gestures; May 7-12, 2011; Vancouver, BC, Canada.
European Search Report dated Jul. 26, 2017.
Chinese Search Report dated Oct. 23, 2017.
Japanese Search Report dated Nov. 7, 2017.

* cited by examiner

| GESTURE TYPE | | DIRECTION | CORRESPONDING KEY INPUT |
|---|---|---|---|
| MOTION GESTURE | TILTING | UP | ENTER KEY FUNCTION |
| | | DOWN | CHANGE INPUT MODE |
| | | LEFT | BACKSPACE KEY FUNCTION |
| | | RIGHT | SPACE KEY FUNCTION |
| | MOVEMENT | UP | UPWARDLY MOVE CURSOR |
| | | DOWN | DOWNWARDLY MOVE CURSOR |
| | | LEFT | LEFTWARDLY MOVE CURSOR |
| | | RIGHT | LEFTWARDLY MOVE CURSOR |
| | ROTATION | CLOCKWISE | CANCEL PREVIOUS KEY INPUT |
| | | COUNTER CLOCKWISE | RE-EXECUTE KEY INPUT |
| MOTION GESTURE | SINGLE TOUCH GESTURE | UP | UPWARDLY MOVE CURSOR |
| | | DOWN | DOWNWARDLY MOVE CURSOR |
| | | LEFT | LEFTWARDLY MOVE CURSOR |
| | | RIGHT | RIGHTWARDLY MOVE CURSOR |
| | MULTI TOUCH GESTURE | UP | DELETE CORRESPONDING COLUMN WHILE UPWARDLY MOVING CURSOR |
| | | DOWN | DELETE CORRESPONDING COLUMN WHILE DOWNWARDLY MOVING CURSOR |
| | | LEFT | DELETE CHARACTER IN CORRESPONDING POSITION WHILE LEFTWARDLY MOVING CURSOR |
| | | RIGHT | DELETE CHARACTER IN CORRESPONDING POSITION WHILE RIGHTWARDLY MOVING CURSOR |
| | | PLURALITY OF INPUTS IN DIFFERENT DIRECTIONS | END KEY INPUT |

FIG.10

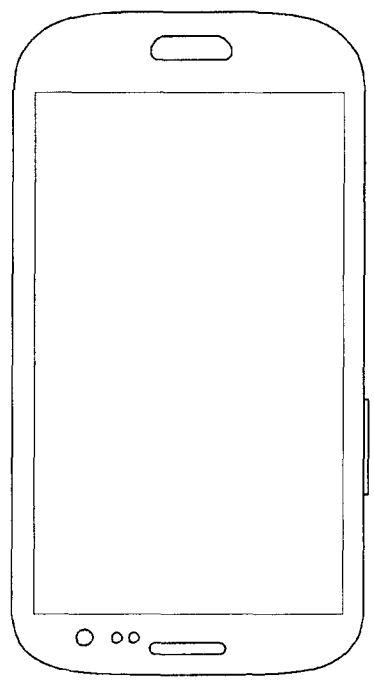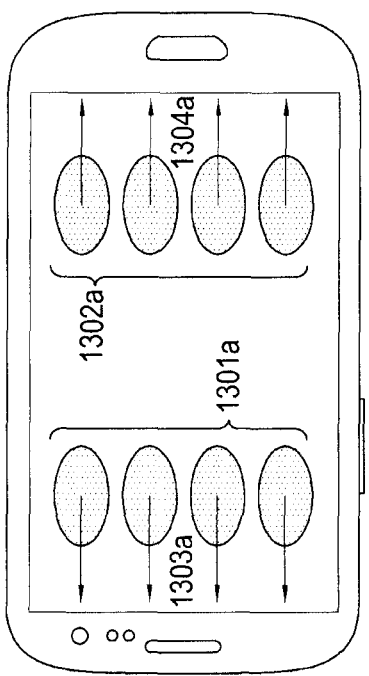
FIG.13A
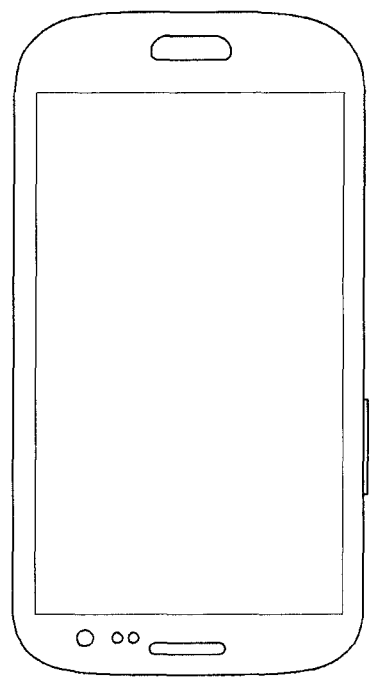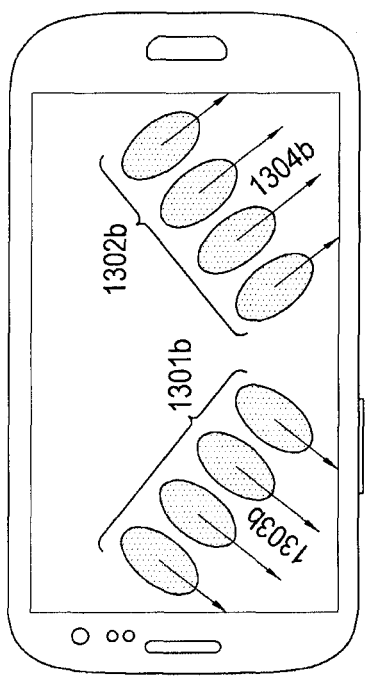
FIG.13B

TOUCHSCREEN KEYBOARD CONFIGURATION METHOD, APPARATUS, AND COMPUTER-READABLE MEDIUM STORING PROGRAM

CLAIM OF PRIORITY

This application claims priority under 35 U.S.C. §119(a) to Korean Application Serial No. 10-2012-0151153, which was filed in the Korean Intellectual Property Office on Dec. 21, 2012 the entire content of which is hereby incorporated by reference.

BACKGROUND

1. Technical Field

The present system concerns a touch screen based user interface and data input unit.

2. Description of the Related Art

Known mobile devices store and execute installed applications manufactured by a manufacturer of the device apparatus as well as additional applications downloaded from the Internet, for example. The additional applications may registered on the website that sells applications and tens of thousands to hundreds of thousands of applications are currently available to be provided to a mobile device free of charge or at a cost dependent on type of destination mobile device.

Accordingly, typically hundreds of applications are stored in a mobile device such as a smart phone or a tablet Personal Computer (PC), and shortcut keys for executing the applications are displayed on a display of a touch screen of the mobile device as icons. A user may touch one of the icons displayed on the display of the touch screen to execute a desired application in the mobile device.

A virtual keyboard on the display of the touch screen is a user interface and gateway to the applications and it is desirable to have a user friendly interface supporting quick user navigation to desired applications and functions.

SUMMARY

A system supports accurate key input of characters in response to user touch, reduces keying errors, and recognizes a position of an input button by forming a virtual keyboard for a Braille input on an area where a touch input is made by the user, even in a condition where the user does not see the virtual keyboard.

An input method usable by a terminal including a touch screen display, identifies first touch input locations on a touch screen. The first touch input locations comprise a predetermined number of concurrent multiple touches. A predetermined number of input buttons comprising a predetermined number of areas on the touch screen are associated with corresponding identified first touch input locations. A touch pattern is detected comprising a second touch input of one or more of the predetermined number of input buttons and an alphanumeric input corresponding to the detected touch pattern is processed.

In a feature, a character input mode is provided including an English input mode and a number input mode and the predetermined number of input buttons is set based on a Braille input method and the alphanumeric character is allocated in accordance with a Braille coding. The method identifies an input gesture of a user and processes a function key input corresponding to the input gesture. The input gesture corresponds to at least one of a terminal motion gesture including tilting, rotation, and movement of the terminal, and a touch gesture including a touch input of the touch screen display. The processing of the function key input corresponding to the input gesture comprises processing at least one of a character input mode change function for changing a type of a character to be input, a cursor movement function for moving a position of a cursor, a character input completion function for prompting completion of a character input, a character deletion function for deleting an input character, and an input end function for prompting an end of a character input. The touch gesture is a drag gesture comprising at least one of a single touch and a multi touch, and the processing of the function key input corresponding to the input gesture comprises moving a position of a cursor according to a movement direction and a size of displacement of the touch drag gesture. Also in an embodiment the touch gesture is a drag gesture in which multiple touches move in substantially the same direction, and the processing of the function key input corresponding to the input gesture comprises deleting an input character in a position corresponding to a movement direction and displacement of the touch drag gesture.

In a further feature, the touch gesture is a drag gesture where concurrent touches move in different directions within a predetermined angle range, and the processing of the function key input corresponding to the input gesture comprises ending a standby state for at least one of, an alphanumeric input and a function key input. The touch gesture is a drag gesture where concurrent multiple touches move in different directions beyond the predetermined angle range.

In yet another feature, a terminal apparatus comprises a touch screen display unit, one or more controllers and a memory that stores at least a user interface key input program. The key input program is configured to be executed by the controller and includes instructions for, identifying first touch input locations on a touch screen associated with a predetermined number of input buttons comprising a predetermined number of areas on the touch screen corresponding to the identified first touch input locations and detecting a touch pattern comprising a second touch input of one or more of the predetermined number of input buttons and associating a key input with the detected touch pattern using a predetermined map associating different detected patterns with corresponding respective key inputs.

In yet a further feature, the key input program further includes a command for providing a character input mode including an English input mode and a number input mode. The different detected patterns associated with corresponding respective key inputs are determined based on a Braille coding and the key input program recognizes an input gesture of a user and processes an input corresponding to the input gesture. A motion sensor detects a terminal motion gesture including tilting, rotation, and movement of the terminal apparatus, wherein the input gesture includes the terminal motion gesture. The input gesture includes a touch gesture including a touch input of the touch screen display. The input corresponding to the input gesture corresponds to at least one of a character mode change that changes a type of a character to be input, a cursor movement that moves a position of a cursor, a character input completion prompts completion of a character input, a character deletion that deletes an input character, and an input end prompts end of a character input.

In an additional feature, a computer-readable recording medium stores one or more programs. The one or more programs comprises instructions for:

identifying first touch input locations on a touch screen and comprising a predetermined number of concurrent multiple touches; associating input buttons in areas on the touch screen with corresponding identified first touch input locations; and detecting a touch pattern comprising a second touch input of one or more of the predetermined number of input buttons and processing an alphanumeric input corresponding to the detected touch pattern.

BRIEF DESCRIPTION OF THE DRAWINGS

The above and other aspects, features, and advantages of the system will be more apparent from the following detailed description taken in conjunction with the accompanying drawings, in which:

FIG. 10 shows an input gesture set by a key input method according to invention principles;

FIGS. 13A and 13B show a touch gesture which can be generated in a key input method according to invention principles.

DETAILED DESCRIPTION

Figure 1A:
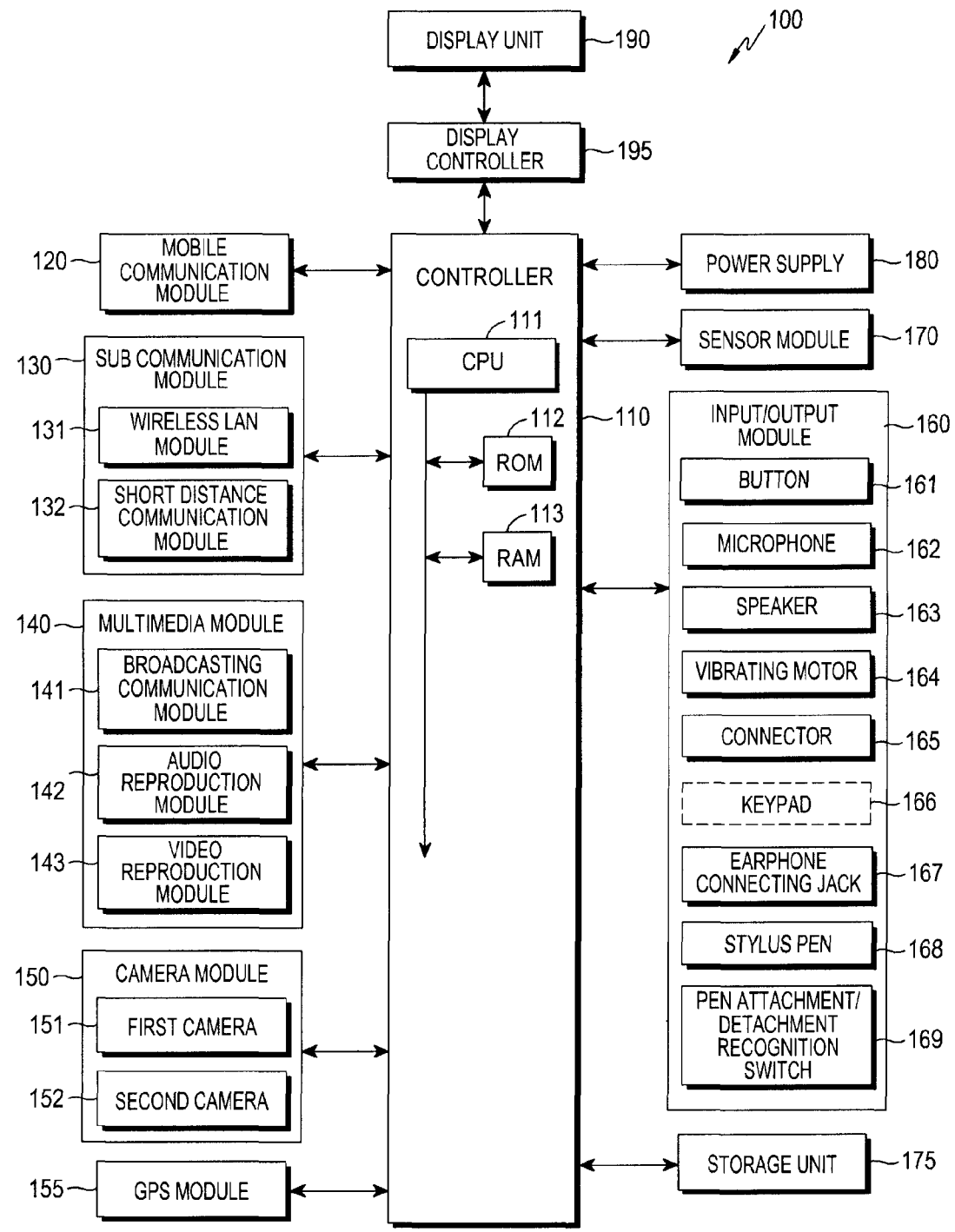
FIG. 1A shows a portable terminal according to invention principles.

Hereinafter, specific exemplary embodiments of the system will be described with reference to the accompanying drawings. The same reference numerals represented in each of the drawings indicate the elements that perform substantially the same functions.

While terms including ordinal numbers, such as "first" and "second," etc., may be used to describe various components, such components are not limited by the above terms. The terms are used merely for the purpose to distinguish an element from the other elements. For example, a first element could be termed a second element, and similarly, a second element could be also termed a first element without departing from the scope. As used herein, the singular forms are intended to include the plural forms as well, unless the context clearly indicates otherwise.

FIG. 1A shows a mobile apparatus 100 that may be connected with an external device (not shown) by using an external device connector such as a sub communication module 130, a connector 165, and an earphone connecting jack 167. The "external device" may include various devices attached to or detached from the apparatus 100 through a wire, such as an earphone, an external speaker, a Universal Serial Bus (USB) memory, a charger, a cradle/dock, a Digital Multimedia Broadcasting (DMB) antenna, a mobile payment related device, a health management device (blood sugar tester or the like), a game machine, a car navigation device and the like. Further, the "external device" may include a Bluetooth communication device, a short distance communication device such as a Near Field Communication (NFC) device, a WiFi Direct communication device, and a wireless Access Point (AC) which may be wirelessly connected to the apparatus 100. In addition, the external device may include another device, a mobile phone, a smart phone, a tablet PC, a desktop PC, and a server.

Apparatus 100 includes a display unit 190 and a display controller 195. Further, the apparatus 100 includes a controller 110, a mobile communication module 120, a sub communication module 130, a multimedia module 140, a camera module 150, a GPS module 155, an input/output module 160, a sensor module 170, a storage unit 175, and a power supplier 180. The sub communication module 130 includes at least one of a wireless LAN module 131 and a short distance communication module 132, and the multimedia module 140 includes at least one of a broadcasting communication module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, a connector 165, and a keypad 166.

The controller 110 may include a CPU 111, a Read Only Memory (ROM) 112 storing a control program for controlling the apparatus 100, and a Random Access Memory (RAM) 113 used as a storage area for storing a signal or data input from the outside of the apparatus 100 or for an operation performed in the apparatus 100. The CPU 111 includes a single core, a dual core, a triple core, or a quadruple core. The CPU 111, the ROM 112, and the RAM 113 may be mutually connected to each other through an internal bus. The controller 110 may control the mobile communication module 120, the sub communication module 130, the multimedia module 140, the camera module 150, the GPS module 155, the input/output module 160, the sensor module 170, the storage unit 175, the power supplier 180, the display unit 190, and the display controller 195.

The mobile communication module 120 enables the apparatus 100 to be connected with an external device through mobile communication by using one antenna or a plurality of antennas (not shown) according to a control of the controller 110. The mobile communication module 120 transmits/receives a wireless signal for a voice call, a video call, a Short Message Service (SMS), or a Multimedia Message Service (MMS) to/from a mobile phone (not shown), a smart phone (not shown), a tablet PC, or another device (not shown) using a phone number input into the apparatus 100. The sub communication module 130 may include at least one of the wireless LAN module 131 and the short distance communication module 132. For example, the sub communication module 130 may include the wireless LAN module 131, the near field communication module 132, or both the wireless LAN module 131 and the near field communication module 132.

The wireless LAN module 131 may be Internet-connected in a place where a wireless Access Point (AP) (not shown) is installed according to a control of the controller 110. The wireless LAN module 131 supports a wireless LAN standard (IEEE802.11x) of the Institute of Electrical and Electronics Engineers (IEEE). The short distance communication module 132 10 may wirelessly perform short distance communication between the apparatus 100 and an image forming apparatus (not shown) according to a control of the controller 110. A short distance communication scheme may include Bluetooth, Infrared Data Association (IrDA) communication, WiFi-Direct communication, Near Field Communication (NFC) and the like. The apparatus 100 may include at least one of the mobile communication module 120, the wireless LAN module 131, and the short distance communication module 132. For example, the apparatus 100 may include a combination of the mobile communication module 120, the wireless LAN module 131, and the short distance communication module 132 according to a capability thereof.

The multimedia module 140 may include the broadcasting communication module 141, the audio reproduction module 142, or the video reproduction module 143. The broadcasting communication module 141 may receive a broadcasting signal (for example, a TV broadcasting signal, a radio broadcasting signal, or a data broadcasting signal) and broadcasting supplement information (for example, Electric Program Guide: EPG or Electric Service Guide: ESG) output from a broadcasting station through a broadcasting communication antenna (not shown) according to a control of the controller 110. The audio reproduction module 142 may reproduce a digital audio file (for example, a file having a file extension of mp3, wma, ogg, or way) stored or received according to a control of the controller 110. The video reproduction module 143 may reproduce a digital video file (for example, a file having a file extension of mpeg, mpg, mp4, avi, mov, or mkv) stored or received according to a control of the controller 110. The video reproduction module 143 may reproduce the digital audio file.

The multimedia module 140 may include the audio reproduction module 142 or the video reproduction module 143 and exclude the broadcasting communication module 141. Further, the audio reproduction module 142 or the video reproduction module 143 of the multimedia module 140 may be included in the controller 110. The camera module 150 may include at least one of the first camera 151 and the second camera 152 for acquiring a still image or a video in response to control of the controller 110. Further, the first camera 151 or the second camera 152 may include an auxiliary light source (for example, a flash (not shown) providing light required for the photographing. The first camera 151 may be disposed on a front surface of the apparatus 100, and the second camera 152 may be disposed on a back surface of the apparatus 100. Alternatively, the first camera 151 and the second camera 152 are closely located to each other (for example, an interval between the first camera 151 and the second camera 152 is larger than 1 cm and smaller than 8 cm) and acquire a three dimensional still image or a three dimensional video.

The GPS module 155 may receive radio waves from a plurality of GPS satellites (not shown) in Earth's orbit and calculate a position of the apparatus 100 by using Time of Arrival from the GPS satellites to the apparatus 100. The input/output module 160 may include at least one of a plurality of buttons 161, the microphone 162, the speaker 163, the vibration motor 164, the connector 165, and the keypad 166. The buttons 161 may be formed on a front surface, a side surface, or a back surface of a housing of the apparatus 100, and may include a power/lock button (not shown) and a volume button (not shown). Further, the buttons 161 may include at least one of a menu button, a home button, a back button, and a search button 161. Although it is described as an example that the buttons 161 are separately arranged at the outside of the housing of the apparatus 100 in hardware, the buttons are not limited thereto. The buttons 161 may be displayed on an area of the display unit 190 in a form of icons or UI elements, or implemented by virtual buttons configured to perform functions pre-allocated by a selection of the corresponding area.

The microphone 162 receives a voice or a sound to generate an electrical signal in response to control of the controller 110. The speaker 163 may output sounds corresponding to various signals (for example, a wireless signal, a broadcasting signal, a digital audio file, a digital video file, taking a picture or the like) of the mobile communication module 120, the sub communication module 130, the multimedia module 140, or the camera module 150 to the outside of the apparatus 100 in response to control of the controller 110. The speaker 163 may output a sound (for example, button tone corresponding to a phone call or ringing tone) corresponding to a function performed by the apparatus 100. One or more speakers 163 may be located in the housing of the apparatus 100.

The vibration motor 164 may convert an electrical signal to a mechanical vibration according to a control of the controller 110. For example, when the apparatus 100 in a vibration mode receives a voice call from another device (not shown), the vibration motor 164 is operated. One or more vibration motors 164 may be formed within the housing of the apparatus 100. The vibration motor 164 may operate in response to a touch action of the user made on the touch screen or successive motions of the touch on the display unit 190. The connector 165 may be used as an interface for connecting the apparatus 100 with an external device (not shown) or a power source (not shown). The apparatus 100 may transmit or receive data stored in the storage unit 175 of the apparatus 100 to or from an external device (not shown) through a wired cable connected to the connector 165 according to a control of the controller 110. Further, the apparatus 100 may receive power from a power source (not shown) through the wired cable connected to the connector 165 or charge a battery (not shown) by using the power source.

The keypad 166 may receive a key input from the user to control the apparatus 100. The keypad 166 includes a physical keypad (not shown) formed in the apparatus 100 or a virtual keypad (not shown) displayed on the display unit 190. The physical keypad (not shown) formed in the apparatus 100 may be omitted. An earphone (not shown) may be inserted into the earphone connecting jack 167 to be connected with apparatus 100. A stylus pen 168 may be inserted into the apparatus 100 to be stored in the apparatus 100, and withdrawn and detached from the apparatus 100 when being used. A pen attachment/detachment recognition switch 169 operating in accordance with attachment or detachment of the stylus pen 168 is located at one area within the apparatus 100 into which the stylus pen 168 is inserted, and thus signals corresponding to the attachment and the detachment of the stylus pen 168 may be provided to the controller 110. The pen attachment/detachment recognition switch 169 is located at one area into which the stylus pen 168 is inserted to directly or indirectly contact the stylus pen 168 when the stylus pen 168 is mounted. Accordingly, the pen attachment/detachment recognition switch 169 generates a signal corresponding to the attachment or the detachment of the stylus pen 168 based on the direct or indirect contact with the stylus pen 168 and provides the generated signal to the controller 110.

The sensor module 170 includes at least one sensor for detecting a state of the apparatus 100. For example, the sensor module 170 may include a proximity sensor for detecting whether the user approaches the apparatus 100, an illuminance sensor (not shown) for detecting an amount of ambient light of the apparatus 100, a motion sensor (not shown) for detecting an operation (for example, a rotation of the apparatus 100, or an acceleration or a vibration applied to the apparatus 100) of the apparatus 100, a geo-magnetic sensor (not shown) for detecting a point of the compass by using the Earth's magnetic field, a gravity sensor for detecting an action direction of the gravity, and an altimeter for measuring an atmospheric pressure to detect an altitude. At least one sensor may detect a state, generate a signal corresponding to the detection, and transmit the signal to the controller 110.

The storage unit 175 may store an input/output signal or data corresponding to the operation of the communication module 120, the sub communication module 130, the multimedia module 140, the camera module 150, the GPS module 155, the input/output module 160, the sensor module 170, or the display unit 190. The storage unit 175 may store a control program and applications for controlling the apparatus 100 or the controller 110. The term "storage unit" includes the storage unit 175, the ROM 112 and the RAM 113 within the controller 110, or a memory card (not shown) (for example, an SD card or a memory stick) installed in the apparatus 100. The storage unit may include a non-volatile memory, a volatile memory, a Hard Disk Drive (HDD), or a Solid State Drive (SSD).

The storage unit 175 may store program commands for processing steps included in a key input method, that is, a step of identifying a first touch input in areas preset for the key input, a step of generating input buttons including virtual buttons in the areas where the first touch input has been generated, and a step of processing a key input corresponding to a second touch input generated by the input button. The controller 110 reads the program commands for executing the key input method and controls hardware components included in the apparatus 100 based on the program commands. Further, the controller 110 may temporarily or continuously store data generated while the program commands are executed in the storage unit 175, display a UI required for performing the key input method on the display unit 190, or receive an input through the displayed UI. The power supplier 180 may supply power to one or more batteries (not shown) arranged at the housing of the apparatus 100 according to a control of the controller 110. The one or more batteries (not shown) supply power to the apparatus 100. Further, the power supplier 180 may supply power input from an external power source (not shown) through a wired cable connected to the connector 165 to the apparatus 100. In addition, the power supplier 180 may supply power wirelessly input from the external power source through a wireless charging technology to the apparatus 100.

The display controller 195 receives different information (for example, information generated to perform a call, data transmission, broadcasting, photography) processed by the controller 110, converts the received different information to data which can be displayed by the display unit 190, and provides the data to the display unit 190. The display unit 190 displays the data received from the display controller 195. For example, the display unit 190 may display a User Interface (UI) or a Graphic User Interface (GUI) related to a call in a call mode. The display unit 190 may include at least one of a liquid crystal display, a thin film transistor-liquid crystal display, an organic light-emitting diode, a flexible display, a 3D display, and an electrophoretic display.

Further, the display unit 190 may be used as an input device as well as an output device, and accordingly, may include a touch screen panel. In addition, the display unit 190 may transmit an analog signal corresponding to at least one touch input through the UI or the GUI to the display controller 195. The display unit 190 may detect one or more touches input through a user's body (for example, fingers including a thumb) or a touchable input means (for example, a stylus pen). The display unit 190 may receive successive motions of the touch among the one or more touches and transmit an analog signal corresponding to the successive motions to the display controller 195. The display unit 190 may detect one or more touches in a resistive type, a capacitive type, an infrared type, or an acoustic wave type.

The touch according to the present invention is not limited to the contact between the display unit 190 and the user's body or the touchable input means, and may include a non-contact (for example, a detectable interval between the display unit 190 and the user's body or the touchable input means is smaller than or equal to 1 mm) The detectable interval on the display unit 190 may be changed according to a capability or a structure of the apparatus 100. Particularly, the display unit 190 may output different values (for example, including current values) detected by a touch event and a hovering event so that the touch event by a contact with the user's body or the touchable input unit and the input event (for example, the hovering event) in a noncontact state can be distinguishably detected. Further, it is preferable that the display unit 190 differently outputs detected values (for example, current values) based on a distance between the display unit 190 and a space where the hovering event is generated.

The display controller 195 converts an analog signal received from the display unit 190 to a digital signal (for example, X and Y coordinates) and transmits the converted digital signal to the controller 110. The controller 110 may control the display unit 190 by using the digital signal received from the display controller 195. For example, the controller 110 may allow a short-cut icon (not shown) displayed on the display unit 190 to be selected or executed in response to a touch event or a hovering event. Further, the display controller 195 may be included in the controller 110. The screen controller 195 may identify a distance between a space where the hovering event is generated and the display unit 190 by detecting a value (for example, a current value) output through the display unit 190, convert the identified distance value to a digital signal (for example, a Z coordinate), and provide the converted digital signal to the controller 110.

Further, the display unit 190 may include two or more touch screen panels which can detect touches or approaches of the user's body and the touchable input unit in order to sequentially or simultaneously receive inputs by the user's body and the touchable input unit. The two or more touch screen panels provide different output values to the display controller 195, and the display controller 195 may differently recognize the values input into the two or more touch screen panels to distinguish whether the input from the touch screen is an input by the user's body or an input by the touchable input unit.

Figure 1B:
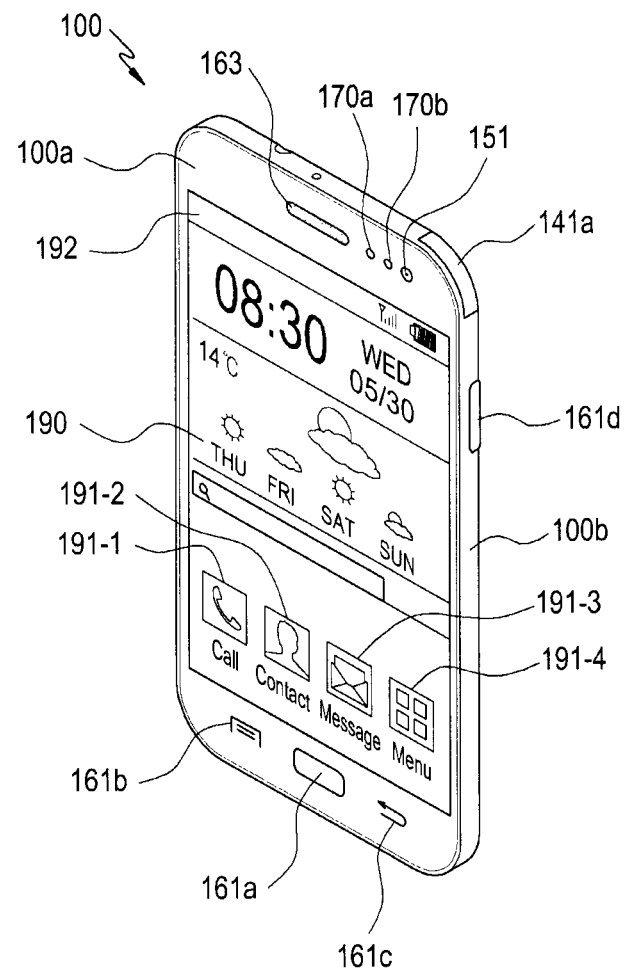
FIG. 1B shows a front perspective view of a portable terminal according to invention principles.
Figure 1C:
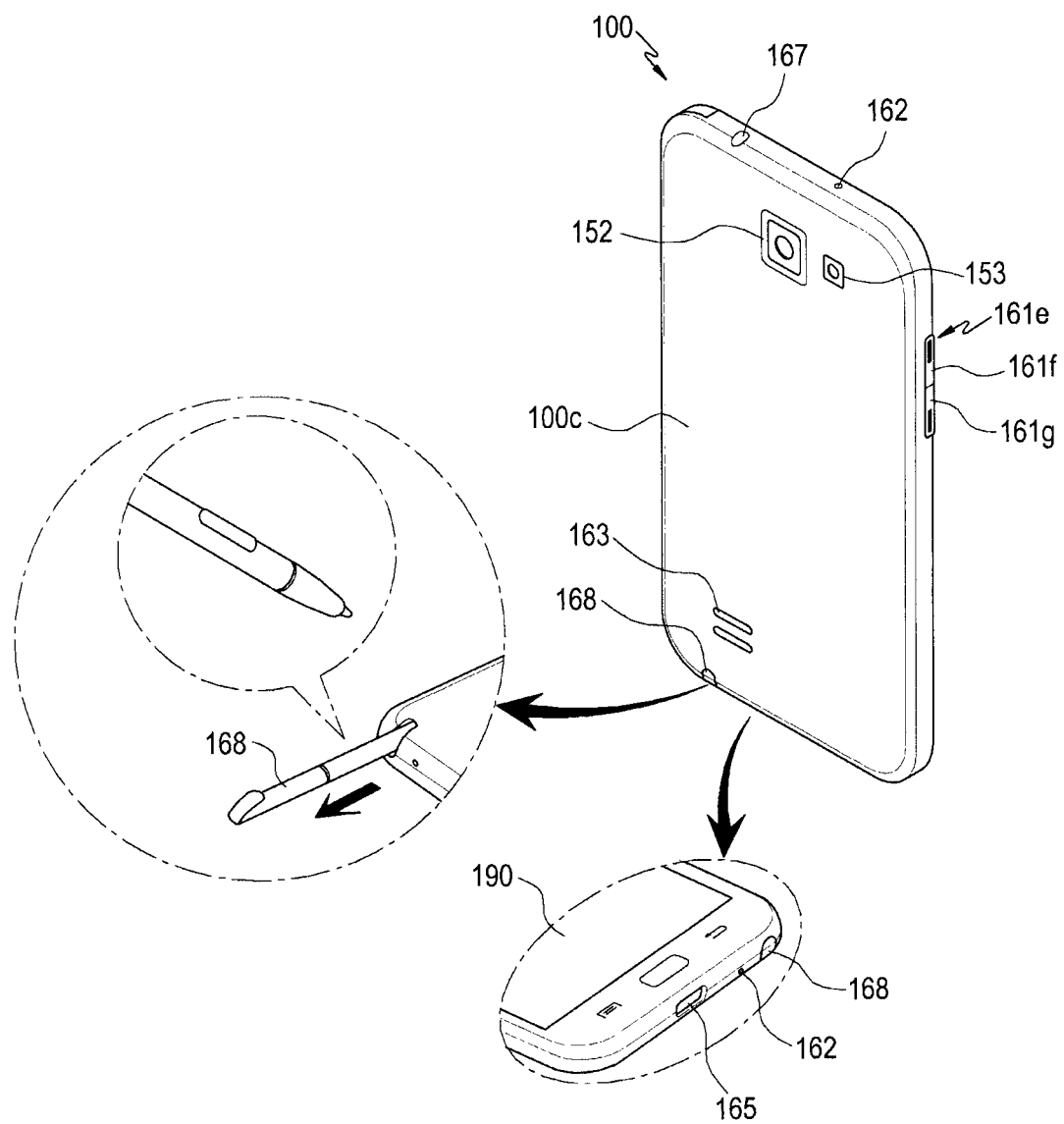
FIG. 1C shows a rear perspective view of a portable terminal according to invention principles.

FIG. 1B is a front perspective view of the mobile apparatus and FIG. 1C is a rear perspective view of the mobile apparatus. Referring to FIGS. 1B and 1C, the display unit 190 is disposed on a center of a front surface 100*a* of the apparatus 100. The display unit 190 has a large size to occupy most of the front surface 100*a* of the apparatus 100. FIG. 1B shows an example where a main home screen is displayed on the display unit 190. The main home screen is a screen displayed when power is turned on or after a screen lock is released and is first displayed on the display unit 190. Further, when the apparatus 100 has different home screens of several pages, the main home screen may be a first home screen or a preset home screen of the home screens of several pages. Short-cut icons 191-1, 191-2, and 191-3 for executing frequently used applications, a main menu switching key 191-4, time, weather and the like may be displayed on the home screen. The main menu switching key 191-4 displays a menu screen on the display unit 190. Further, a status bar 192 which shows a status of the apparatus 100 such as a battery charging status, intensity of a received signal, and a current time may be formed on an upper end of the display unit 190. As functions (for example, inputting a caller's number in a call application, inputting text in a text message application, inputting text in an Instant Message (IM) application, and inputting a character (or number) in a search application) are executed, the controller 110 may provide the UI, the virtual buttons, or the key input window provided by the key input method to the display unit 190, and the display unit 190 may display the UI, the virtual buttons, or the key input window provided by the key input method.

A home button 161*a*, a menu button 161*b*, and a back button 161*c* may be formed below the display unit 190. The home button 161*a*, the menu button 161*b*, and the back button 161*c* are located below the display unit 190 as separated hardware keys as illustrated in FIG. 1B, but the keys of the present invention are not limited thereto. For example, the home button 161*a*, the menu button 161*b*, and the back button 161*c* may be located at an area of the display unit 190, for example, below the shortcut icons 191-1, 191-2, and 191-3 as virtual buttons such as icons or UIs to perform functions of the home button 161*a*, the menu button 161*b*, and the back button 161*c*. The home button 161*a* displays the main home screen on the display unit 190. For example, when the home button 161*a* is pressed in a state where a home screen different from the main home screen or the menu screen is displayed on the display unit 190, the main home screen may be displayed on the display unit 190. Further, when the home button 161*a* is pressed while applications are executed on the display unit 190, the main home screen illustrated in FIG. 1B may be displayed on the display unit 190. In addition, the home button 161*a* may be used to display recently used applications or a task manager on the display unit 190.

The menu button 161*b* provides a connection menu which can be used on the display unit 190. The connection menu includes a widget addition menu, a background changing menu, a search menu, an editing menu and an environment setup menu, for example. The back button 161*c* may display the screen which was executed just before the currently executed screen or end the most recently used application. The first camera 151, an illumination sensor 170*a*, and a proximity sensor 170*b* may be disposed on edges of the front surface 100*a* of the apparatus 100. The second camera 152, the flash 153, and the speaker 163 may be disposed on a rear surface 100*c* of the apparatus 100. For example, a power/reset button 161*d*, a volume button 161*b*, a terrestrial DMB antenna 141*a* for reception of broadcasting, and one or more microphones 162 may be disposed on a side surface 100*b* of the apparatus 100. The DMB antenna 141*a* may be fixed to the apparatus 100 or may be formed to be detachable from the apparatus 100. Further, the connector 165 is formed on a lower side surface of the apparatus 100. A plurality of electrodes are formed in the connector 165, and the connector 165 may be connected to an external device through a wire. The earphone connecting jack 167 may be formed on an upper side surface of the apparatus 100. An earphone may be inserted into the earphone connecting jack 167. The stylus pen 168 and a hole that stores the stylus pen 168 may be located at a lower side surface of the apparatus 100. The stylus pen 168 may be inserted into the apparatus 100 to be stored in the apparatus 100, and withdrawn and detached from the apparatus 100 when being used.

Programs are performed through different computer means and recorded in a computer-readable medium. The computer-readable medium may include a program command, a data file, and a data structure individually or a combination thereof stored in the storage unit 175 of the apparatus 100, and the program command may be temporarily stored in the RAM 113 included in the controller 110. Accordingly, the controller 110 may control hardware components included in the apparatus 100 in accordance with program commands, temporarily or continuously store data generated and provide a UI required for executing the methods.

Figure 2:
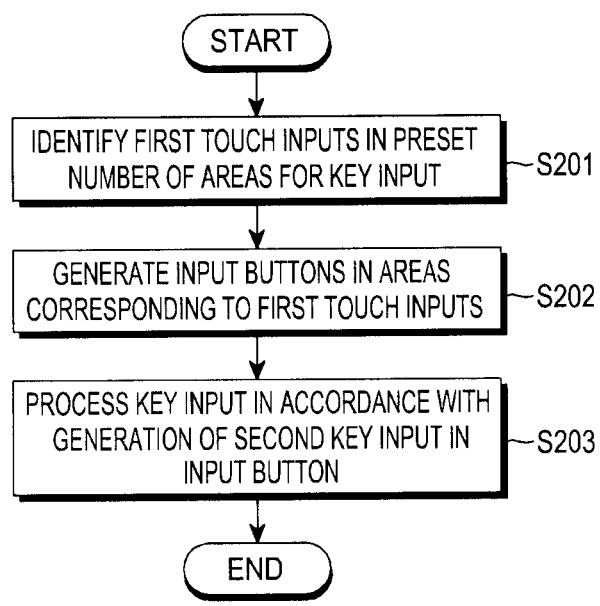
FIG. 2 shows a flowchart of a method of key input operation according to invention principles.

FIG. 2 shows a flowchart of a method of operation of a key input method where in step S201 first touch inputs are identified in a preset number of areas for key input. In step S202 input buttons are generated in the areas where the first touch inputs have been generated, respectively, and in step S203 a key input is processed corresponding to second touch inputs generated using the input buttons. When the first touch input by a touch input medium (for example, a user's finger) is generated on a touch screen display in step S201, the terminal initiates an operation of the key input method and determines whether the number of areas where the first touch inputs have been generated correspond to the preset number for the key input. When the first touch inputs corresponding to the preset number for the key input are generated, the terminal identifies coordinates of areas where the first touch inputs have been generated.

Figure 3A:
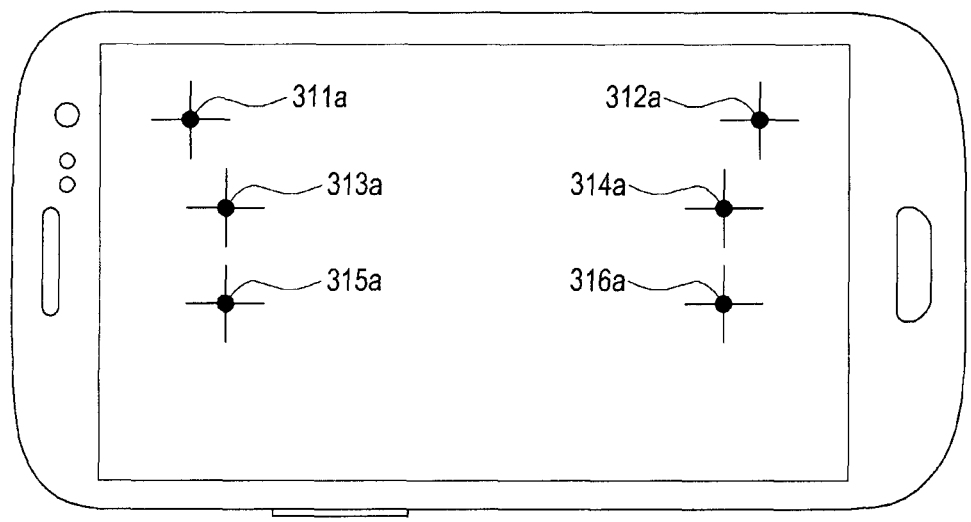
FIG. 3A, FIG. 3B, FIG. 3C and FIG. 3D show identification of a first touch input according to invention principles.
Figure 3B:
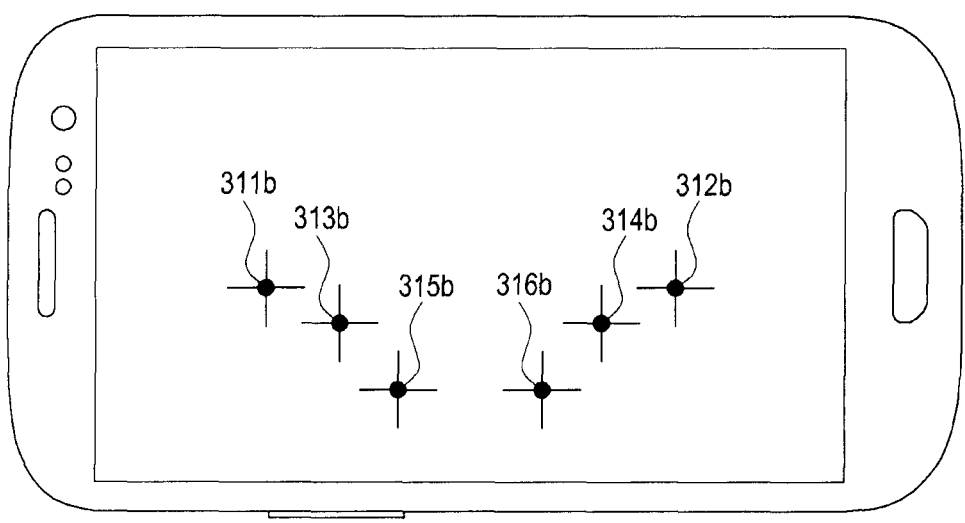
Figure 3C:
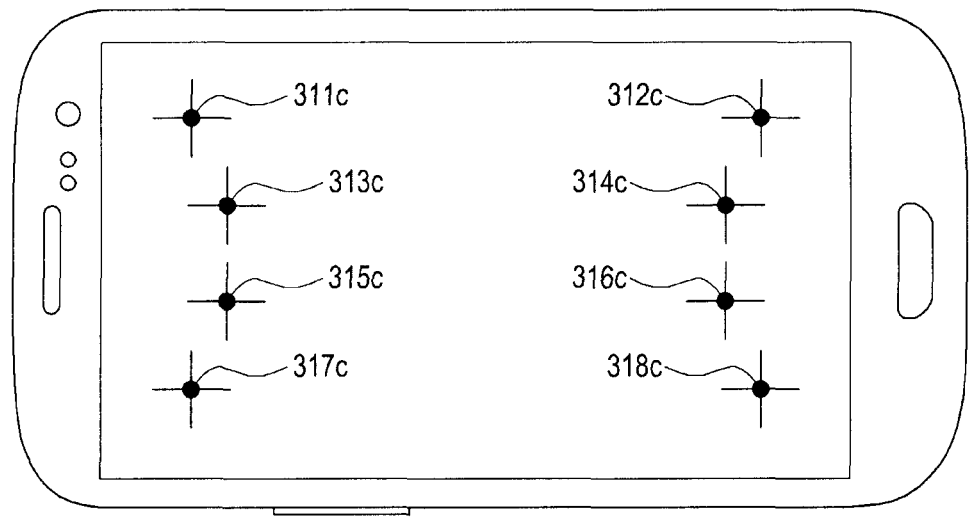
Figure 3D:
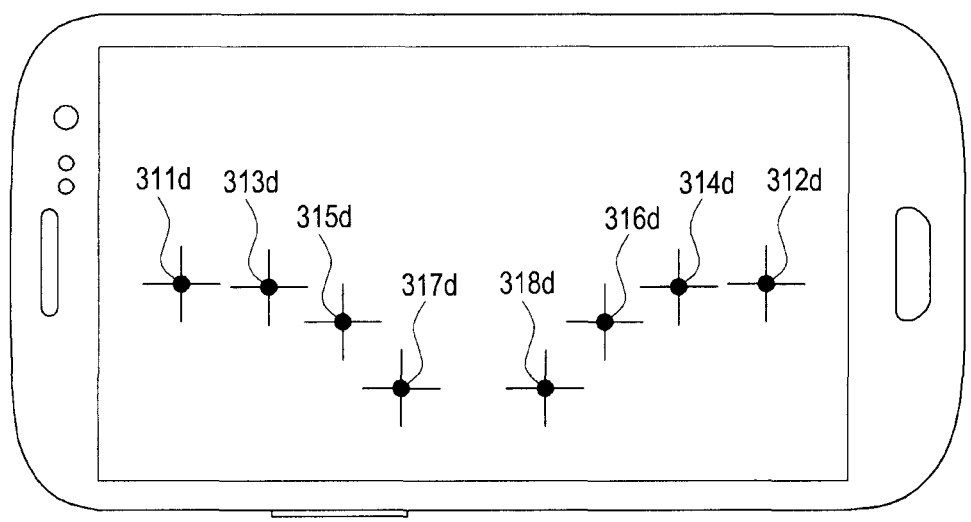

For example, in step S201, the terminal identifies that the first touch inputs are generated in areas 311*a~b*, 312*a~b*, 313*a~b*, 314*a~b*, 315*a~b*, and 316*a~b* illustrated in FIGS. 3A and 3B, or areas 311*c~d*, 312*c~d*, 313*c~d*, 314*c~d*, 315*c~d*, 316*c~d*, 317*c~d*, and 318*c~d* illustrated in FIGS. 3C and 3D and identifies that the number of areas where the first touch inputs have been generated corresponds to the preset number (for example, six or eight) for the Braille input, so as to detect coordinate values of the areas where the first touch inputs have been generated.

Figure 4A:
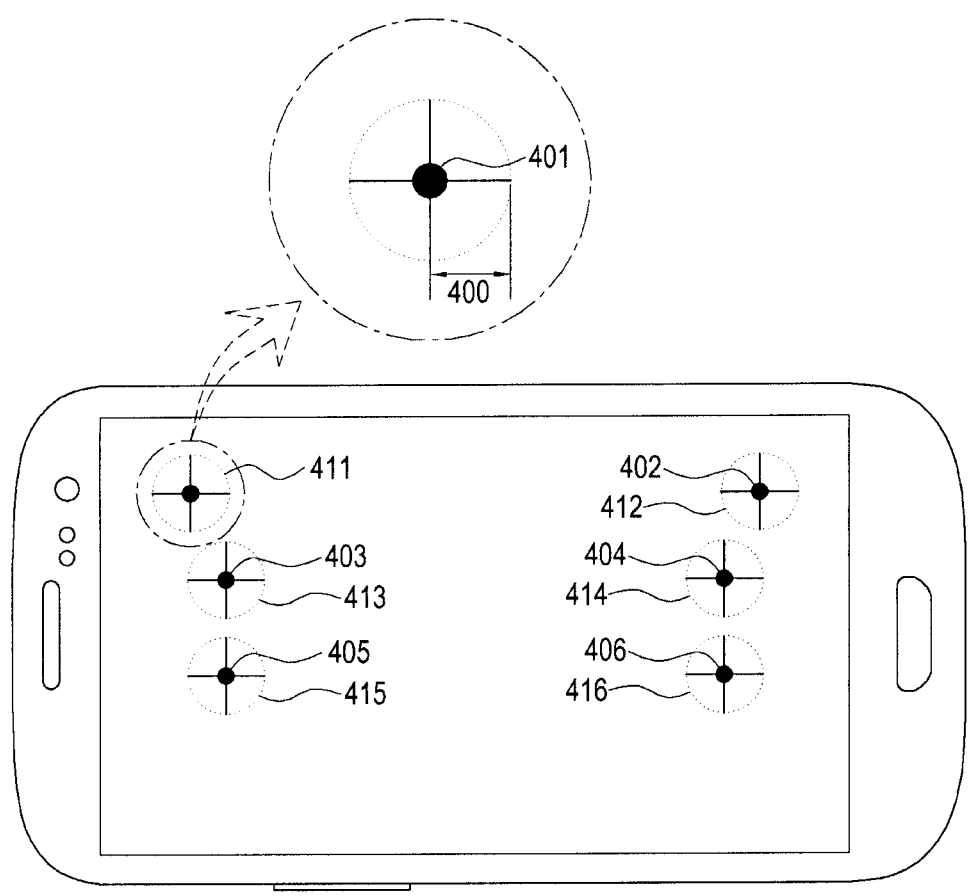
FIG. 4A and FIG. 4B show input buttons provided by a key input method according to invention principles.

In step S202, the terminal sets input buttons corresponding to the areas where the first touch inputs have been generated such that the user in a specific class can more accurately perform the Braille input. For example, the terminal generates an input button 411 in an area within a preset radius 400 based on a point 401 where the first touch input has been generated as illustrated in FIG. 4A. Further, with respect to a plurality of points 401, 402, 403, 404, 405, and 406 where the first touch inputs have been generated, the terminal generates a plurality of input buttons 411, 412, 413, 414, 415, and 416 in the same way. The input button 411 is variably generated on the touch screen display in accordance with the first touch input by the user, and may be implemented by a virtual button such as a UI element or an icon formed by a predetermined program command.

Figure 4B:
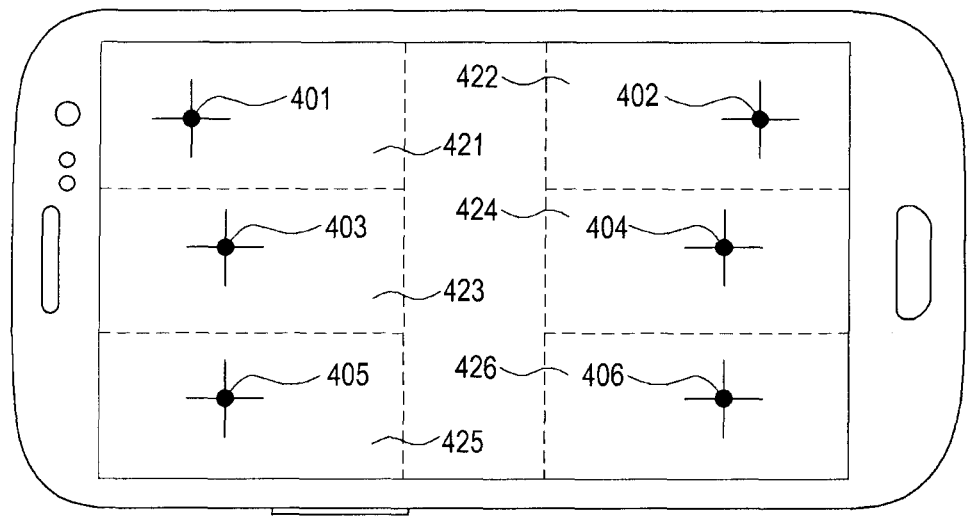

The terminal sets the input buttons 411, 412, 413, 414, 415, and 416 to have areas within the predetermined radius 400 based on the points 401, 402, 403, 404, 405, and 406 where the first touch inputs have been generated. Thereby users in a specific class such as blind people can more accurately perform Braille input without separately detecting or recognizing Braille areas preset during a terminal manufacturing step. For example, the area of the input button within the predetermined radius 400 based on the point 401 where the first touch input has been generated may have a quadrangular shape or an oval shape having predetermined directivity in consideration of a characteristic of the touch input by the user as well as a circular shape. As illustrated in FIG. 4B, the terminal may divide the touch screen display into the number of areas where the first touch inputs have been generated based on the points 401, 402, 403, 404, 405, and 406 where the first touch inputs have been generated, and set the areas including the points 401, 402, 403, 404, 405, and 406 as the input buttons 421, 422, 423, 424, 425, and 426, respectively. Further, shapes or positions of the areas of the set input buttons may be changed according to a third touch input or several consecutive touch inputs by the user. As the user continues the touch input, a position of the touch input for a specific input button may be moved, and the terminal may track a position movement of the touch input by using a heuristic algorithm and differently change the shape or position of the area of a set input button.

In step S202, the terminal may set and display the area corresponding to the input button to be distinguishable from a background screen of the terminal such that the user can easily identify the input button. In addition, the terminal may provide proper vibration feedback or voice feedback to the area corresponding to the input button so that the user can identify the input. The terminal generates the input button in an area based on the first touch input generated in the area, thereby a key input can be conveniently and accurately performed without identification of a preset key area by the user. Braille is more likely to be used by users in a specific class (for example, blind people) having relatively poor sight, and thus the user in the specific class may see not all information displayed on the touch screen display. Accordingly, the user in the specific class having relatively poor sight has a difficulty in activating a mode (particularly, Braille input mode) for key input. Switching to a Braille input mode is advantageously achieved through generating the first touch input on the touch screen display using a touch input medium (for example, a user's finger). In response to first touch inputs on the touch screen display, the terminal identifies whether the number of areas where the first touch inputs have been generated corresponds to the preset number for Braille input. As the first touch inputs corresponding to the preset number of the Braille input are generated, the terminal may automatically switch to a mode for Braille input (Braille input mode). Accordingly, the user in the specific class having relatively poor sight may perform the key input more conveniently without complex interaction.

Further, the terminal configures a fixed preset Braille input virtual keyboard having a Braille input button on the touch screen display. A user in the specific class may have difficulty in distinguishing a preset Braille area and the system enables Braille input more conveniently and accurately without separately detecting or recognizing a preset Braille area. The terminal may also preset and store key input based on a preset input method. Further, when a second touch input is generated via an input button, the terminal may process the corresponding key input based on the preset key input in step S203. In steps S201 and S202, since the first touch input is made using both hands of the user, six, eight, or ten touch inputs may be simultaneously made. Further, since the input button is generated in the areas where the first touch inputs have been generated, there may be six, eight, or ten input buttons, for example. The system provides six, eight, or ten input buttons that can be differently combined, for example. Further, Braille made for the special purpose of recognizing characters by blind people may advantageously use 6 Braille or 8 Braille.

Figure 5:
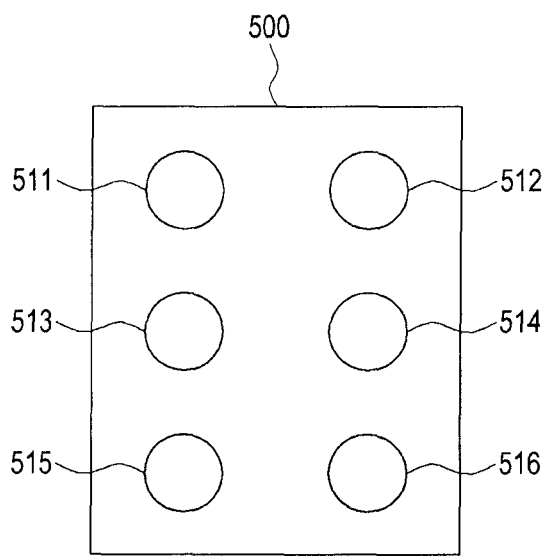
FIG. 5 shows 6 Braille matching input buttons used in a key input method according to invention principles.
Figure 6A:
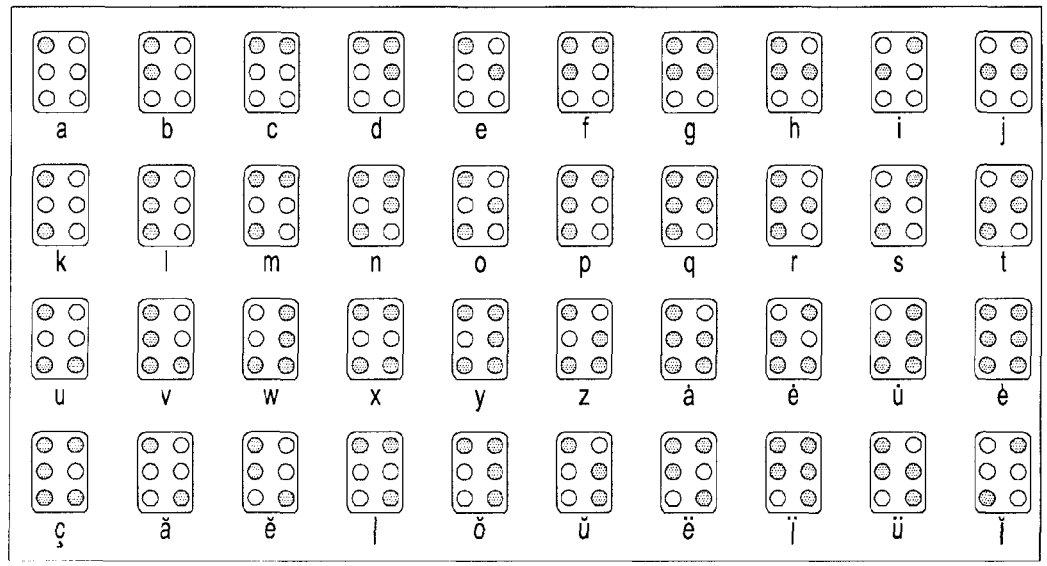
FIG. 6A, FIG. 6B and FIG. 6C show characters allocated to input buttons by a key input method according to invention principles.
Figure 6B:
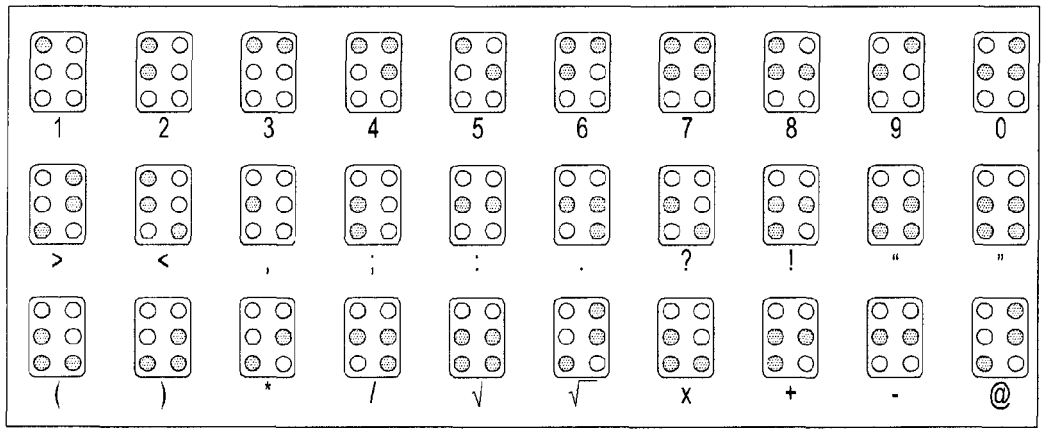
Figures 6C, 7:
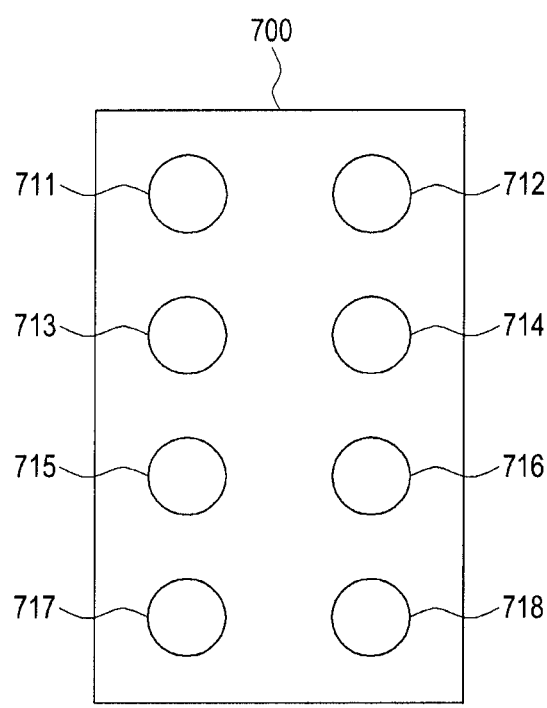
FIG. 7 shows 8 Braille matching input buttons used by a key input method according to invention principles.

For example, when the number of input buttons set in steps S201 and S202 is six, the terminal may determine the preset input method as a 6 Braille input method. That is, in step S202, the terminal matches the preset input buttons (for example, input buttons 411, 412, 413, 414, 415, and 416) with first to sixth Braille areas 511, 512, 513, 514, 515, and 516 (see FIG. 5) included in 6 Braille input areas. For example, the terminal may perform the setting as illustrated in FIGS. 6A to 6C. Since positions of the input buttons are changed whenever the input buttons are set, the terminal may match the input buttons with the Braille areas in response to relative positions or arrangement types of the set input buttons. Further, the terminal may transmit feedback of whether the set input buttons are matched with the Braille areas or a matching state to the user. For example, the terminal may provide voice guidance of "6 Braille input method has been set", and make a request for identifying whether the input buttons are correctly matched with the Braille areas through voice guidance of "input "a"". When the user inputs "a" according to the voice guidance but the key input according to existing mapping does not correspond to "a", the mapping with the input buttons may be set again by rotating the Braille areas. When the terminal randomly maps the input buttons and the Braille areas and then the input of "a" received from the user does not correspond to a first Braille input 511 but corresponds to a sixth Braille input 516, the mapping may be made again by rotating the Braille areas by 180 degrees without changing positions of the input buttons. Further, the mapping between the input buttons and the Braille areas may be automatically modified by the terminal or may be modified by a control by the user. As a second touch input event is generated on the touch screen display by the user, a key input among the first, second, third, fourth, fifth, or sixth Braille area 511, 512, 513, 514, 515, and 516 of the 6 key input areas is identified. Further, an area corresponding to a key input of the 6 Braille input method (FIGS. 6A to 6C) is identifies. For example, when the second touch input is generated in the input button 411 corresponding to the first Braille 511, the terminal identifies the input of a letter "a". When the second touch input is generated in the input button 411 corresponding to the first Braille 511 and the input button 413 corresponding to the third Braille 513, the terminal identifies the input of a letter "b".

Figure 8A:
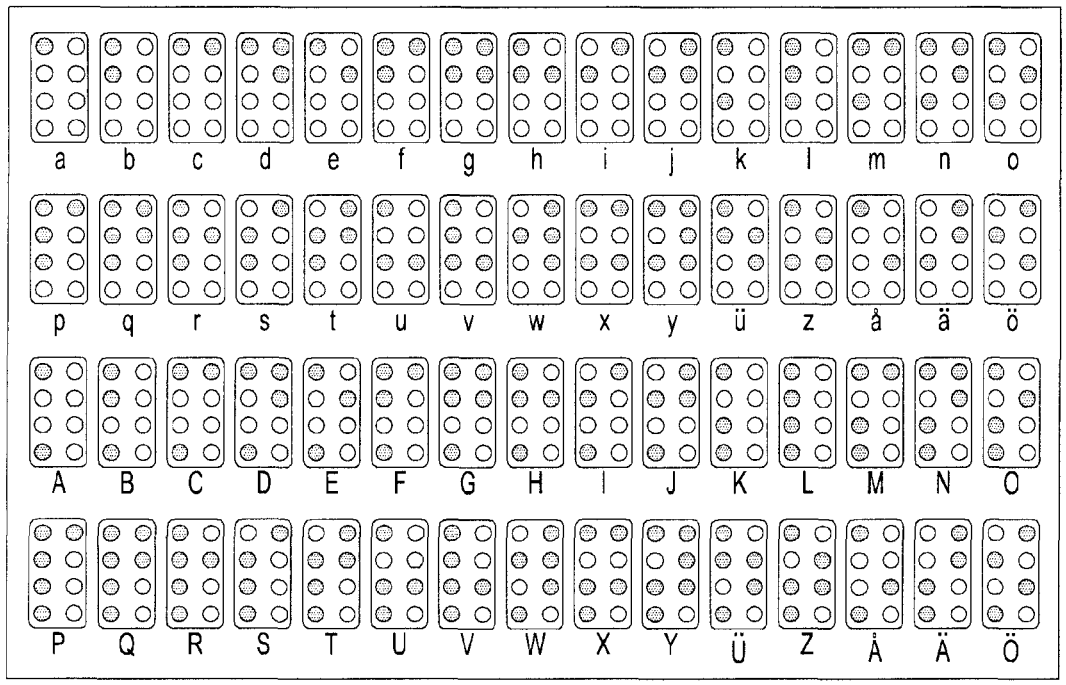
FIG. 8A and FIG. 8B show characters allocated to input buttons by a key input method according to invention principles.
Figure 8B:
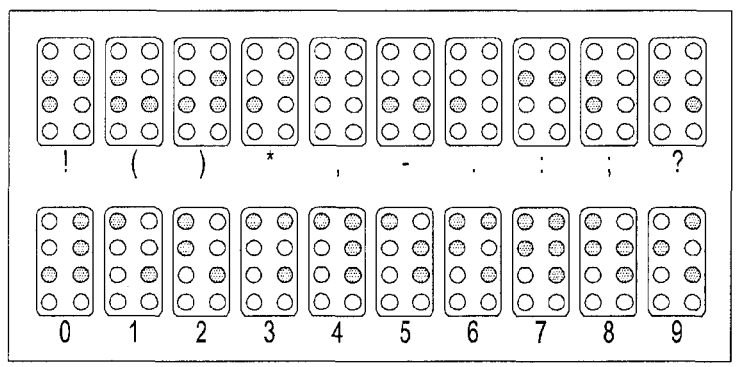

In another example, when the number of input buttons set in step S202 is eight, the terminal may set the preset input method as an 8 Braille input method. That is, the terminal matches the input buttons set in step S202 with first to eighth Braille areas 711, 712, 713, 714, 715, 716, 717, and 718 (see FIG. 7) included in 8 Braille input areas. A second touch input is identified in an area comprising the first, second, third, fourth, fifth, sixth, seventh, or eighth Braille area 711, 712, 713, 714, 715, 716, 717, or 718 of the 8 Braille input areas. A point where the second touch input event has been generated enables identification of the corresponding key input (see FIGS. 8A and 8B). For example, when the second touch input is generated in the input button corresponding to the first Braille 711, the terminal identifies the input of a letter "a". When the second touch input is generated in the input button corresponding to the first Braille 711 and the input button corresponding to the seventh Braille 717, the terminal identifies the input of a letter "A". The Braille input method may be performed in a plurality of modes, and key inputs may be differently recognized and processed according to each of the modes. For example, the 6 Braille input method may include an English input mode, a number/special character input mode, and a Korean input mode. When the second touch input is generated in the input button 411 corresponding to the first Braille 511, it may be identified and processed that a letter "a" is input in the English input mode and a number "1" is input in the number/special character input mode. The system detects a touch pattern comprising a touch input of one or more predetermined number of input buttons and associates an alphanumeric character with the detected touch pattern using a predetermined map associating different detected patterns with corresponding respective characters.

As described above, the Braille input method including the plurality of modes may be set to be in a default mode (for example, English mode) when being operated, and may switch between the plurality of modes by a gesture input described below. The key input method may include a step for an operation of processing the input gesture. The operation of processing the input gesture may be performed after the switching to the key input mode in step S201 and before the end of the key input method, and may be initiated by a preset gesture input to perform the input gesture.

Figure 9:
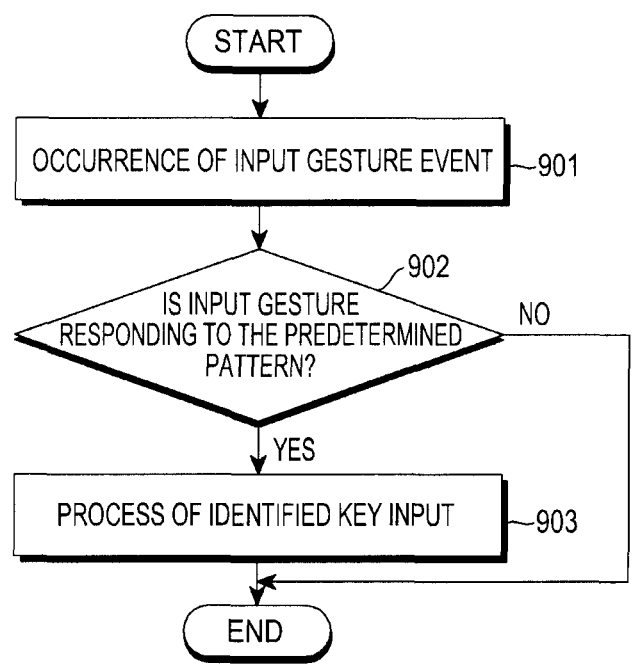
FIG. 9 shows a flowchart of a method of operation for processing an input gesture included in a key input method according to invention principles.

FIG. 9 is a flowchart of a method of sequential operation for processing an input gesture of the key input method. The terminal first identifies the generation of an input gesture event having a predetermined pattern in step S901 and initiates the operation for processing the input gesture. The input gesture has a predetermined pattern and may be a motion gesture identified using a motion sensor of the terminal or a touch gesture input through the touch screen display included in the terminal In step S901, when it is detected that a sensor value input from the motion sensor is equal to or larger than a preset motion gesture threshold, the terminal determines that a motion gesture event has been generated. Further, when it is detected that movement displacement of a drag gesture input through the touch screen display is equal to or larger than a preset touch gesture threshold, the terminal determines that a touch gesture event has been generated.

Figure 11A:
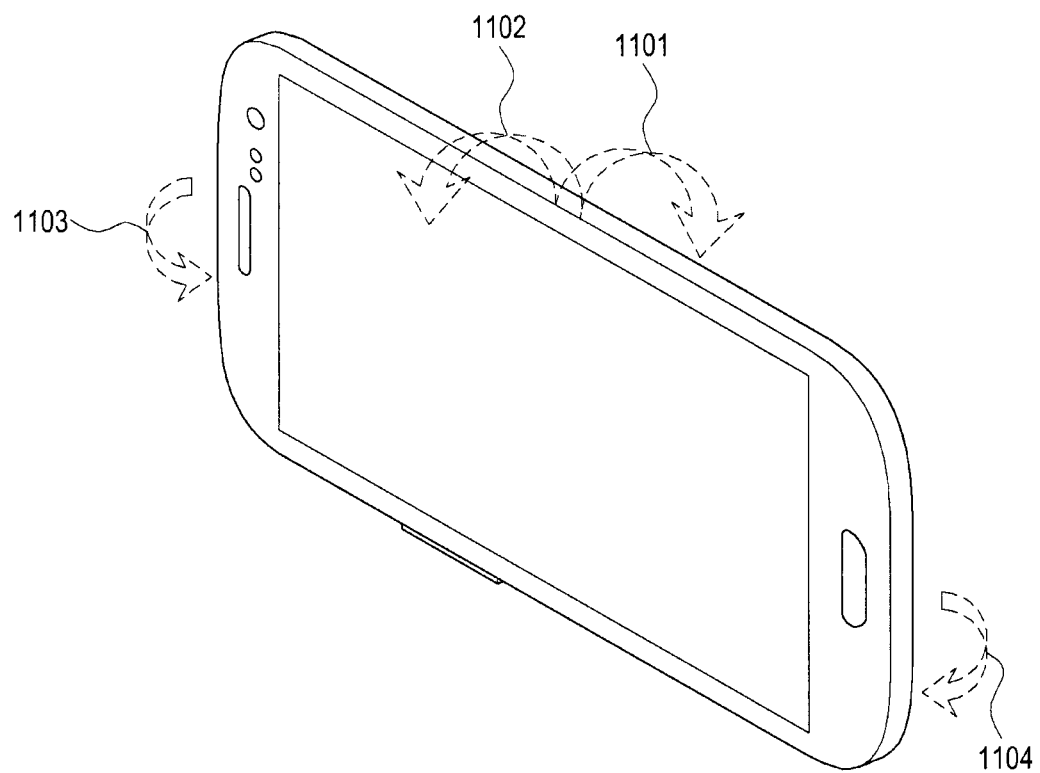
FIG. 11A, FIG. 11B and FIG. 11C show a motion gesture which can be generated in a key input method according to invention principles.
Figure 11B:
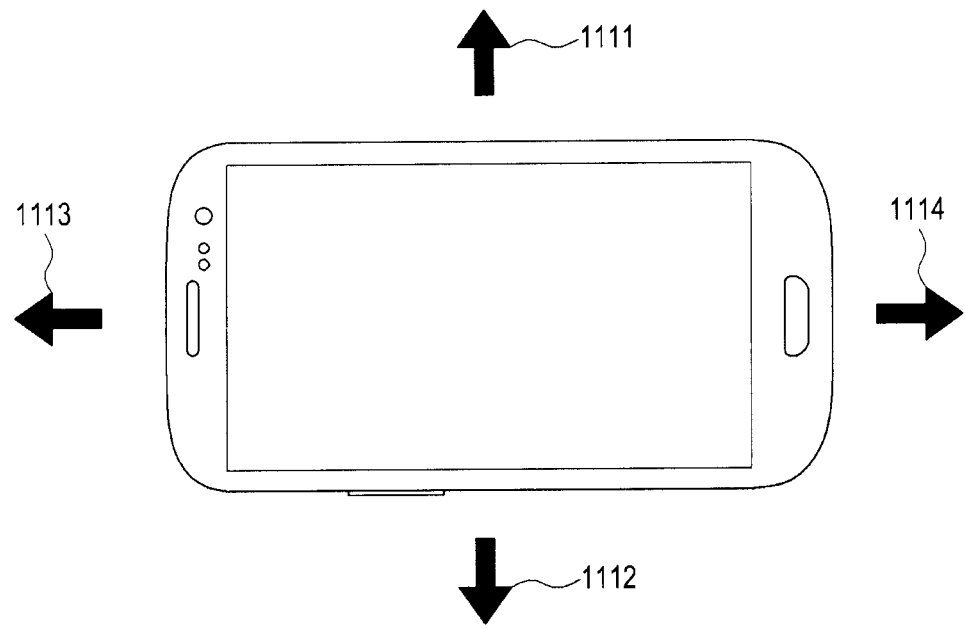
Figure 11C:
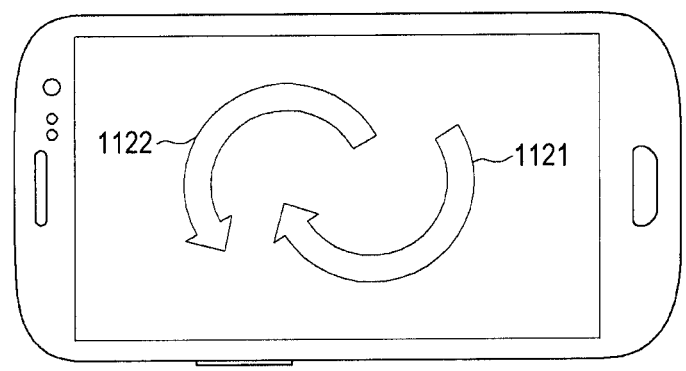

In step S902, the terminal determines whether the input gesture corresponds to the predetermined pattern. For example, the predetermined pattern may include motion gestures and touch gestures shown in a Table of FIG. 10. The motion gesture may include tilting, movement and rotation, for example of the terminal As illustrated in FIG. 11A, the tilting may include gestures in which the terminal moves in a first direction 1101 such that an upper edge of the terminal is pushed, a second direction 1102 such that the upper edge of the terminal is pulled, a third direction 1103 such that a left edge of the terminal is pulled, and a fourth direction 1104 such that a right edge of the terminal is pulled. As illustrated in FIG. 11B, the movement may include gestures in which the terminal moves in a direction 1111 (for example, an up direction) opposite to the ground, in a direction 1112 (for example, a down direction) toward the ground, in a left direction 1113, and a right direction 1114. Further, as illustrated in FIG. 11C, the rotation may include gestures in which the terminal moves clockwise 1121 and counterclockwise 1122.

Figure 12A:
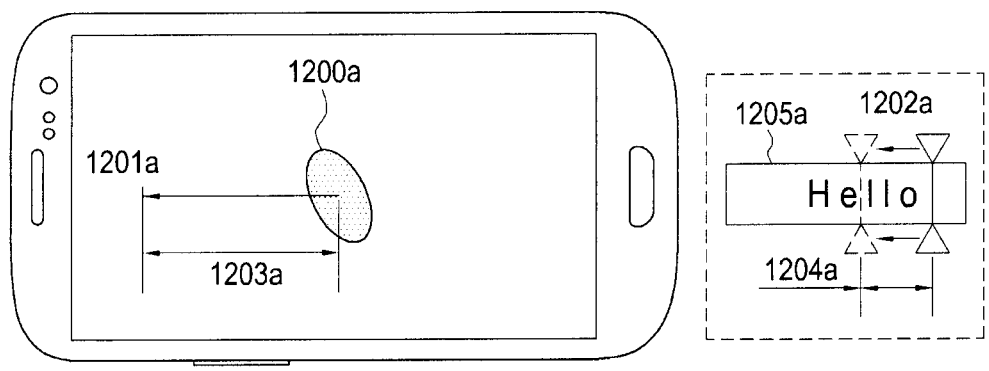
FIG. 12A, FIG. 12B, FIG. 12C, FIG. 12D, FIG. 12E, FIG. 12F, FIG. 12G and FIG. 12H show a touch gesture which can be generated in a key input method according to invention principles.
Figure 12B:
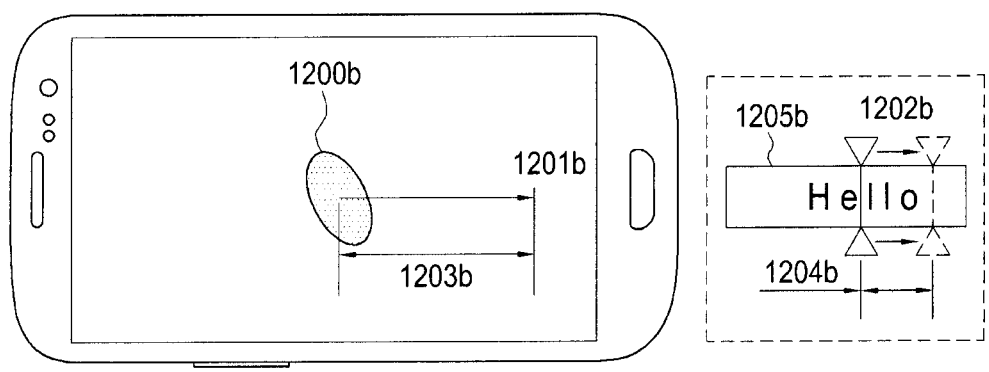
Figure 12C:
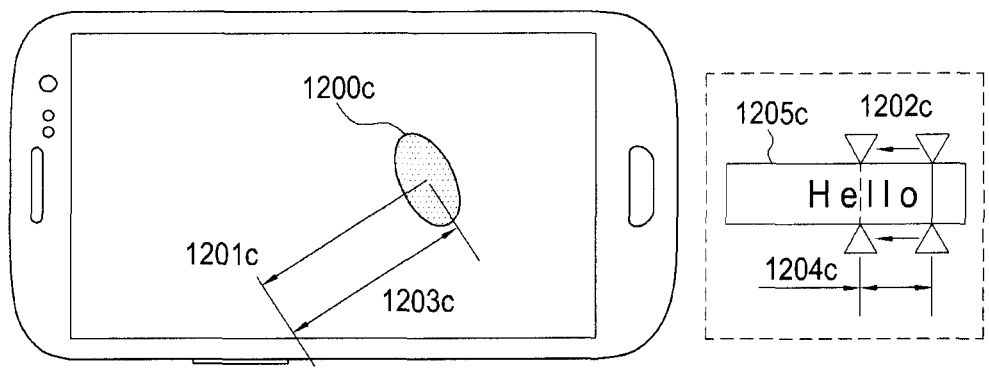
Figure 12D:
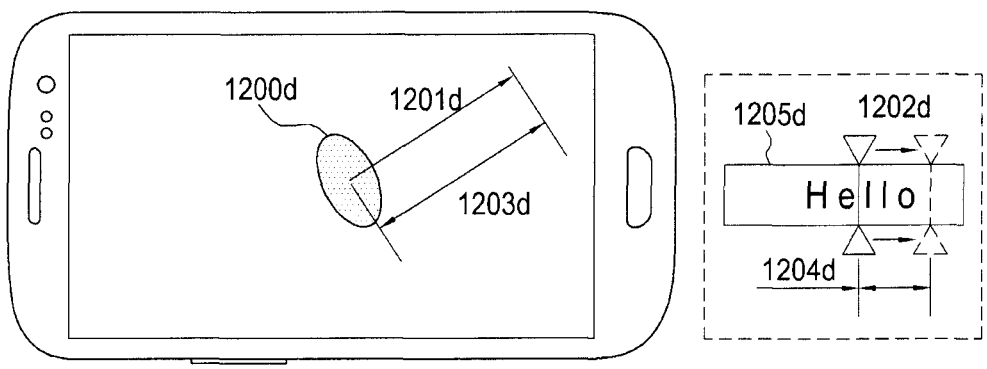

The touch gesture may include a single touch drag and a multi touch drag. The single touch drag may include a drag gesture input by a single touch input as illustrated in FIGS. 12A to 12D, and the multi touch drag may include a drag gesture input in which a plurality of touch inputs move in the same direction (see FIGS. 12E to 12H) and a drag gesture input in which a plurality of touch inputs move in different directions (see FIGS. 12I and 12J) as illustrated in FIGS. 12E to 12J. When the input gesture corresponds to the gesture shown in the Table of FIG. 10, the terminal identifies a key input corresponding to the input gesture and performs an operation for processing the corresponding key input in step S903. For example, when a tilting motion gesture is generated by an action of tilting the terminal in the first direction 1101, the terminal may process an enter key input. When a tilting motion gesture is generated by an action of tilting the terminal in the second direction 1102, the terminal may process an input of changing the input mode (for example, English input mode, number/special character mode, and Korean input mode). Further, when a tilting motion gesture is generated by an action of tilting the terminal in the third direction 1103, the terminal may process a space key input. When a tilting motion gesture is generated by an action of tilting the terminal in the fourth direction 1104, the terminal may process a backspace key input. In addition, when a motion gesture is generated by a terminal movement, the terminal moves a position of a cursor within a character input window in proportion to a movement direction and a size of movement displacement of the terminal Meanwhile, when the single touch drag is generated, the terminal moves the cursor in a direction corresponding to the direction of the single touch drag within a character input window, and a movement degree of the cursor is reflected in proportion to a size of movement displacement For example, as illustrated in FIG. 12A, as a single touch 1200*a* is dragged in a left direction 1201*a*, the terminal may move the cursor existing in a character input window 1205*a* in a left direction 1202*a* corresponding to the drag direction, and determine a movement degree 1204*a* of the cursor in proportion to a length 1203*a* by which the drag of the single touch 1200*a* has been input. Similarly, as illustrated in FIG. 12B, as a single touch 1200*b* is dragged in a right direction 1201*b*, the terminal may move the cursor existing in a character input window 1205*b* in a right direction 1202*b*, and determine a movement degree 1204*b* of the cursor in proportion to a length 1203*b* by which the drag of the single touch 1200*b* has been input. A single touch drag may be input in different directions and the cursor may be moved in accordance with the single touch drag input in the different directions. For example, as illustrated in FIGS. 12C and 12D, even though single touch drags 1200*c* and 1200*d* are input in diagonal directions, the terminal may move cursors 1202*c* and 1202*d* within character input windows 1205*c* and 1205*d* in accordance with progress directions 1201c and 1201d and progress lengths 1203c and 1203d of the single touch drags in the same way as described above.

Figure 12E:
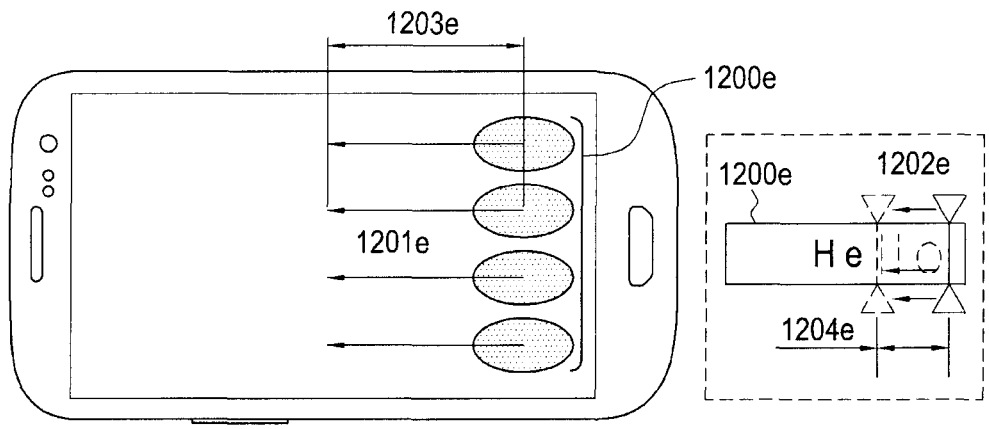
Figure 12F:
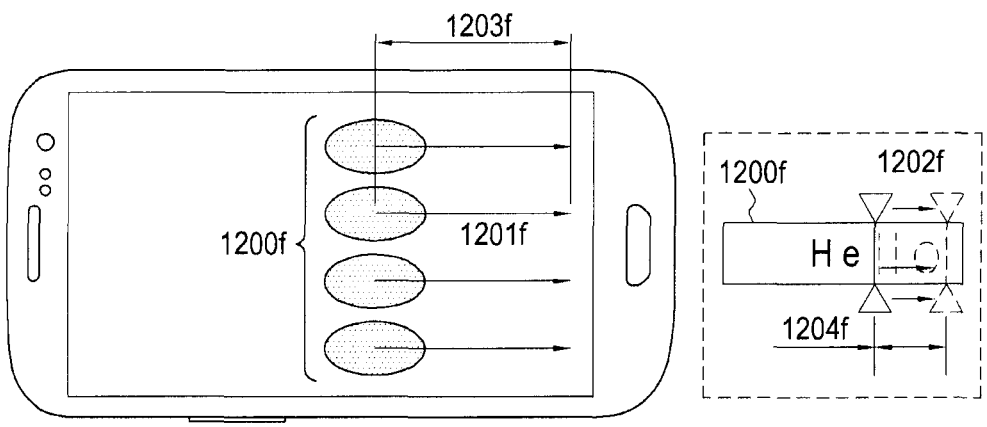
Figure 12G:
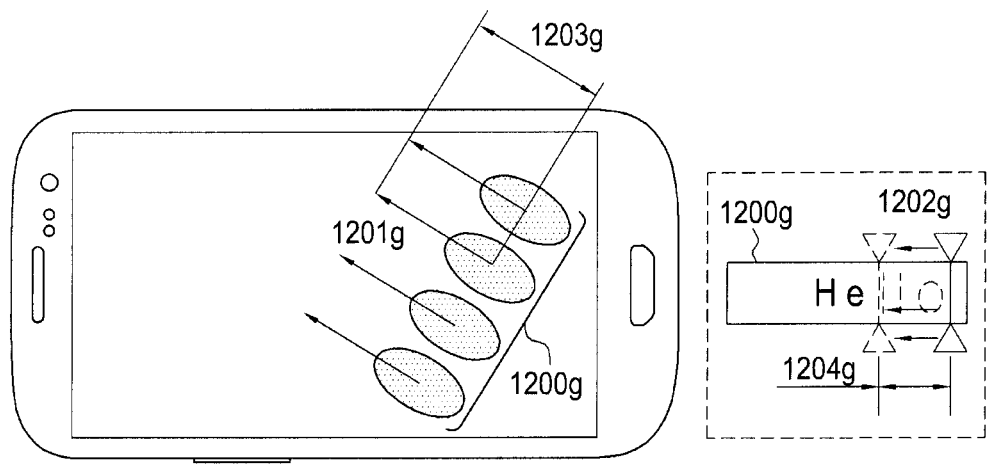
Figure 12H:
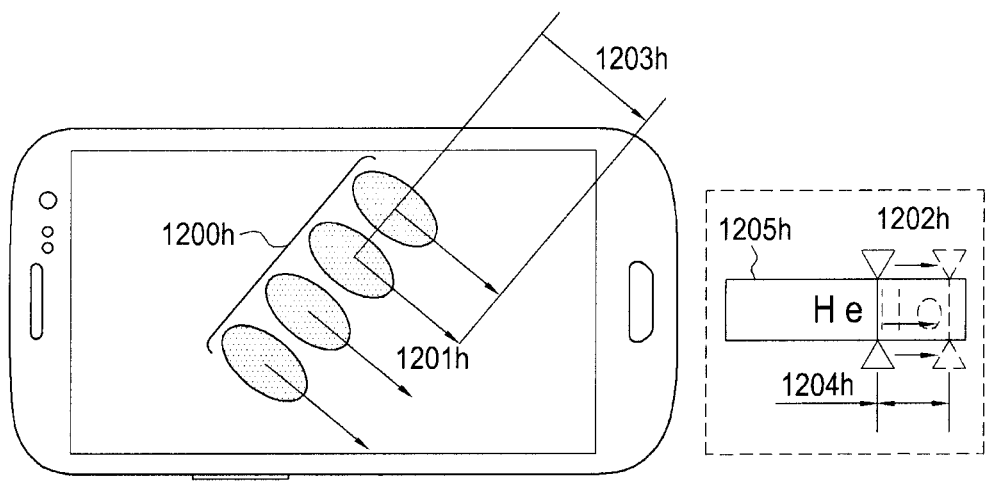

Further, when a multi touch drag moving in the same direction is generated, the terminal may delete characters existing in the corresponding areas while moving the cursor in a direction corresponding to the direction of the multi touch drag. For example, as illustrated in FIG. 12E, as a multi touch 1200e is dragged in a left direction 1201e, the terminal may delete an input character existing in the corresponding area while moving the cursor existing in a character input window 1200e in a left direction 1202e corresponding to the drag direction. The terminal may determine a movement degree 1204e of the cursor within the input window in proportion to a length 1203e by which the drag of the multi touch 1200e has been input. Similarly, as illustrated in FIG. 12F, as a multi touch 1200f is dragged in a right direction 1201f, the terminal may reflect a movement degree 1204f of the cursor in proportion to a length 1203f by which the multi touch 1200f has been input and delete an input character existing in the corresponding area while moving the cursor existing in a character input window 1200f in a right direction 1202f. A cursor may be moved in accordance with the multi touch drag input in different directions. For example, as illustrated in FIGS. 12G and 12H, even though multi touch drags 1200g and 1200h are input in diagonal directions, the terminal may delete input characters within character input windows 1205g and 1205h in accordance with progress directions 1201g and 1201h and progress lengths 1203g and 1203h of the multi touch drags in the same way as described above.

Further, the terminal may end the key input method with the input of the multi touch drag moving in different directions. For example, as illustrated in FIG. 13A, as a first multi touch input 1301a is dragged in a first direction 1303a and a second multi touch input 1302a is dragged in a second direction 1304a opposite to the first direction 1303a, the terminal may end the key input method.

Similarly, as illustrated in FIG. 13B, as a first multi touch input 130 lb is dragged in a first direction 1303b and a second multi touch input 1302b is dragged in a second direction 1304b opposite to the first direction 1303b, the terminal may end the key input method. Different modifications can be applied. For example, as the first multi touch input 1301a and the second multi touch input 1302a are input in facing directions toward a center of the touch screen display as illustrated in FIG. 13A, or as the first multi touch input 1301b and the second multi touch input 1302b are input in crossing directions toward a center of the touch screen display as illustrated in FIG. 13B, the terminal may end the key input method.

It is apparent that the key input by the input gesture can be differently modified by those skilled in the art in consideration of user's convenience. It will be appreciated that the exemplary embodiments of the system may be implemented in a form of hardware, software, or a combination of hardware and software. Such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present invention. Accordingly, the present invention includes a program for a code implementing the apparatus and method described in the appended claims of the specification and a machine (a computer or the like)-readable storage medium for storing the program. Moreover, such a program as described above can be electronically transferred through an arbitrary medium such as a communication signal transferred through cable or wireless connection. Moreover, the above-described mobile terminal can receive the program from a program provision device which is connected thereto in a wired or wireless manner, and store the program.

A program providing apparatus may include a program including instructions to perform a preset contents protection method, a memory for storing information required for the contents protection method, a communication unit for performing wired or wireless communication, and a controller for controlling program transmission. When receiving a request for providing the program from a portable terminal, the program providing apparatus may provide the program to the portable terminal through a wire or wirelessly. Further, even when there is no request for providing the program from the portable terminal, for example, when the portable terminal is located within a particular place, the program providing apparatus may provide the program to the portable terminal through a wire or wirelessly.

The above-described embodiments can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. The functions and process steps herein may be performed automatically or wholly or partially in response to user command. An activity (including a step) performed automatically is performed in response to executable instruction or device operation without user direct initiation of the activity. No claim element herein is to be construed under the provisions of 35 U.S.C. 112, sixth paragraph, unless the element is expressly recited using the phrase "means for."

What is claimed is:

1. An input method usable by a terminal including a touch screen display, the input method comprising:
   identifying a first touch input on the touch screen display, the first touch input comprising a predetermined number of concurrent multiple touches;
   providing a predetermined number of input buttons corresponding to a predetermined number of areas on the touch screen display in response to the first touch input, wherein the predetermined number of input buttons have a first set of positions and a first set of borders based on a selected Braille input method;
outputting a voice request for input of a predetermined alphanumeric character, wherein the predetermined alphanumeric character corresponds to an input of a character allocated in accordance with the predetermined number of input buttons corresponding to the selected Braille input method;
detecting a touch pattern comprising a second touch input on one or more of the predetermined number of input buttons in response to the request;
determining whether a responsive alphanumeric character input corresponding to the detected touch pattern matches the requested predetermined alphanumeric character input; and
changing positions of the predetermined number of input buttons if determining that the responsive alphanumeric character input does not match the requested predetermined alphanumeric character input,
wherein changing positions comprises processing an alphanumeric character corresponding to the detected touch pattern rotated 180 degrees when the terminal determines the requested predetermined alphanumeric character input and the responsive alphanumeric character input do not match,
wherein changing positions further comprises remapping the predetermined number of input buttons to a set of alphanumeric characters such that the remapping represents mapping rotated 180 degrees, and wherein the input buttons maintain the same first set of positions and the first set of borders as prior to the remapping.

2. The input method of claim 1, further comprising providing a character input mode including an English input mode and a number input mode.

3. The input method of claim 1, further comprising:
identifying an input gesture of a user; and
processing a function key input corresponding to the input gesture.

4. The input method of claim 3, wherein the input gesture corresponds to at least one of a terminal motion gesture including tilting, rotation, and movement of the terminal, and a touch gesture including a touch input of the touch screen display.

5. The input method of claim 3, wherein the processing of the function key input corresponding to the input gesture comprises processing at least one of a character input mode change function for changing a type of a character to be input, a cursor movement function for moving a position of a cursor, a character input completion function for prompting completion of a character input, a character deletion function for deleting an input character, and an input end function for prompting an end of a character input.

6. The input method of claim 4, wherein the touch gesture is a drag gesture comprising at least one of a single touch and a multi touch, and the processing of the function key input corresponding to the input gesture comprises moving a position of a cursor according to a movement direction and a size of displacement of the drag gesture.

7. The input method of claim 4, wherein the touch gesture is a drag gesture in which multiple touches move in substantially the same direction, and the processing of the function key input corresponding to the input gesture comprises deleting an input character in a position corresponding to a movement direction and displacement of the drag gesture.

8. The input method of claim 4, wherein the touch gesture is a drag gesture where concurrent touches move in different directions within a predetermined angle range, and the processing of the function key input corresponding to the input gesture comprises ending a standby state for at least one of, an alphanumeric input and the function key input.

9. The input method of claim 8, wherein the touch gesture is a drag gesture where concurrent multiple touches move in different directions beyond the predetermined angle range.

10. The input method of claim 1, further comprising:
detecting tilting of the terminal; and
processing a key function corresponding to tilting of the terminal, wherein the key function is selected from a group consisting of enter, backspace, changing input mode, or space.

11. The input method of claim 1, further comprising:
detecting rotation of the terminal; and
processing a key function corresponding to rotation of the terminal, wherein the key function is selected from a group consisting of cancel previous input and re-execute the previous input.

12. A terminal apparatus comprising:
a touch screen display unit;
one or more controllers; and
a memory that stores at least a user interface key input program,
wherein the user interface key input program is configured to be executed by the one or more controllers and includes instructions for:
identifying a first touch input on the touch screen display unit, the first touch input comprising a predetermined number of concurrent multiple touches;
providing a predetermined number of input buttons corresponding to a predetermined number of areas on the touch screen display unit in response to the first touch input, wherein the predetermined number of input buttons have a first set of positions and a first set of borders based on a selected Braille input method;
outputting a voice request for input of a predetermined alphanumeric character, wherein the predetermined alphanumeric character corresponds to an input of a character allocated in accordance with the predetermined number of input buttons corresponding to the selected Braille input method;
detecting a touch pattern comprising a second touch input on one or more of the predetermined number of input buttons in response to the request;
determining whether a responsive alphanumeric character input corresponding to the detected touch pattern matches the requested predetermined alphanumeric character input; and
changing positions of the predetermined number of input buttons if determining that the responsive alphanumeric character input does not match the requested predetermined alphanumeric character input,
wherein changing positions comprises processing an alphanumeric character corresponding to the detected touch pattern rotated 180 degrees when the terminal determines the requested predetermined alphanumeric character input and the responsive alphanumeric character input do not match,
wherein changing positions further comprises remapping the predetermined number of input buttons to a set of alphanumeric characters such that the remapping represents mapping rotated 180 degrees, and wherein the input buttons maintain the same first set of positions and the first set of borders as prior to the remapping.

13. The terminal apparatus of claim 12, wherein the key input program further includes a command for providing a character input mode including an English input mode and a number input mode.

14. The terminal apparatus of claim 12, wherein the key input program recognizes an input gesture of a user and processes an input corresponding to the input gesture.

15. The terminal apparatus of claim 14, further comprising a motion sensor that detects a terminal motion gesture including tilting, rotation, and movement of the terminal apparatus, wherein the input gesture includes the terminal motion gesture.

16. The terminal apparatus of claim 14, wherein the input gesture includes a touch gesture including a touch input of the touch screen display.

17. The terminal apparatus of claim 15, wherein the input corresponding to the input gesture corresponds to at least one of a character mode change that changes a type of a character to be input, a cursor movement that moves a position of a cursor, a character input completion prompts completion of a character input, a character deletion that deletes an input character, and an input end that prompts end of a character input.

18. The terminal apparatus of claim 16, wherein the touch gesture is a drag gesture of one or more touch inputs, and processing a key input corresponding to the input gesture comprises moving a position of a cursor according to a movement direction and a size of displacement of the drag gesture.

19. The terminal apparatus of claim 16, wherein the touch gesture is a drag gesture in which a plurality of touch inputs move in substantially the same direction, and processing a key input corresponding to the input gesture comprises deleting an input character in a position corresponding to a movement direction and a size of displacement of the drag gesture.

20. The terminal apparatus of claim 16, wherein the touch gesture is a drag gesture in which a plurality of touch inputs move in different directions, and processing a key input corresponding to the input gesture comprises processing an end of the key input.

21. The terminal apparatus of claim 20, wherein the touch gesture is a drag gesture in which a plurality of touch inputs move in opposite directions.

22. A non-transitory computer-readable recording medium storing one or more programs, the one or more programs comprising instructions for:

identifying a first touch input on a touch screen, the first touch input comprising a predetermined number of concurrent multiple touches;

providing a predetermined number of input buttons corresponding to a predetermined number of areas on the touch screen in response to the first touch input, wherein the predetermined number of input buttons have a first set of positions and a first set of borders based on a selected Braille input method;

outputting a voice request for input of a predetermined alphanumeric character, wherein the predetermined alphanumeric character corresponds to an input of a character allocated in accordance with the predetermined number of input buttons corresponding to the selected Braille input method;

detecting a touch pattern comprising a second touch input on one or more of the predetermined number of input buttons in response to the request;

determining whether a responsive alphanumeric character input corresponding to the detected touch pattern matches the requested predetermined alphanumeric character input; and changing positions of the predetermined number of input buttons if determining that the responsive alphanumeric character input does not match the requested predetermined alphanumeric character input, wherein changing positions comprises processing an alphanumeric character corresponding to the detected touch pattern rotated 180 degrees when the requested predetermined alphanumeric character input and the responsive alphanumeric character input do not match, wherein changing positions further comprises remapping the predetermined number of input buttons to a set of alphanumeric characters such that the remapping represents mapping rotated 180 degrees, and wherein the input buttons maintain the same first set of positions and the first set of borders as prior to the remapping.

* * * * *